(12) United States Patent
Yanagisawa

(10) Patent No.: US 7,472,336 B2
(45) Date of Patent: Dec. 30, 2008

(54) DATA DETECTOR AND MULTI-CHANNEL DATA DETECTOR

(75) Inventor: Ryogo Yanagisawa, Osaka (JP)

(73) Assignee: Panasonic Corporation, Osaka (JP)

( * ) Notice: Subject to any disclaimer, the term of this patent is extended or adjusted under 35 U.S.C. 154(b) by 848 days.

(21) Appl. No.: 11/035,798

(22) Filed: Jan. 18, 2005

(65) Prior Publication Data
US 2005/0206542 A1 Sep. 22, 2005

(30) Foreign Application Priority Data
Mar. 10, 2004 (JP) .............................. 2004-067863

(51) Int. Cl.
*G06F 11/00* (2006.01)
*H04L 7/00* (2006.01)
(52) U.S. Cl. ....................................... 714/798; 375/368
(58) Field of Classification Search ................. 714/775, 714/789, 798, 820
See application file for complete search history.

(56) References Cited

U.S. PATENT DOCUMENTS 5,081,654 A * 1/1992 Stephenson et al. ......... 375/368
5,289,476 A 2/1994 Johnson et al.
6,104,770 A * 8/2000 Yama .......................... 375/368

FOREIGN PATENT DOCUMENTS

JP 60-091739 5/1985

* cited by examiner

*Primary Examiner*—Shelly A Chase
(74) *Attorney, Agent, or Firm*—McDermott Will & Emery LLP

(57) ABSTRACT

A data detector detects an identification signal of a prescribed format from N-bit wide parallel input data (where N is a natural number). The data detector includes P first comparing sections (where P is a natural number), Q second comparing sections (where Q is a natural number), and a determining section. Each of the P first comparing sections compares one of first P data of continuous (P+Q) data in the parallel input data with a first pattern. Each of the Q second comparing sections compares one of Q data following the P data with a second pattern. The determining section determines whether the identification signal has been detected or not according to a comparison result of the P first comparing sections and a comparison result of the Q second comparing sections.

10 Claims, 22 Drawing Sheets

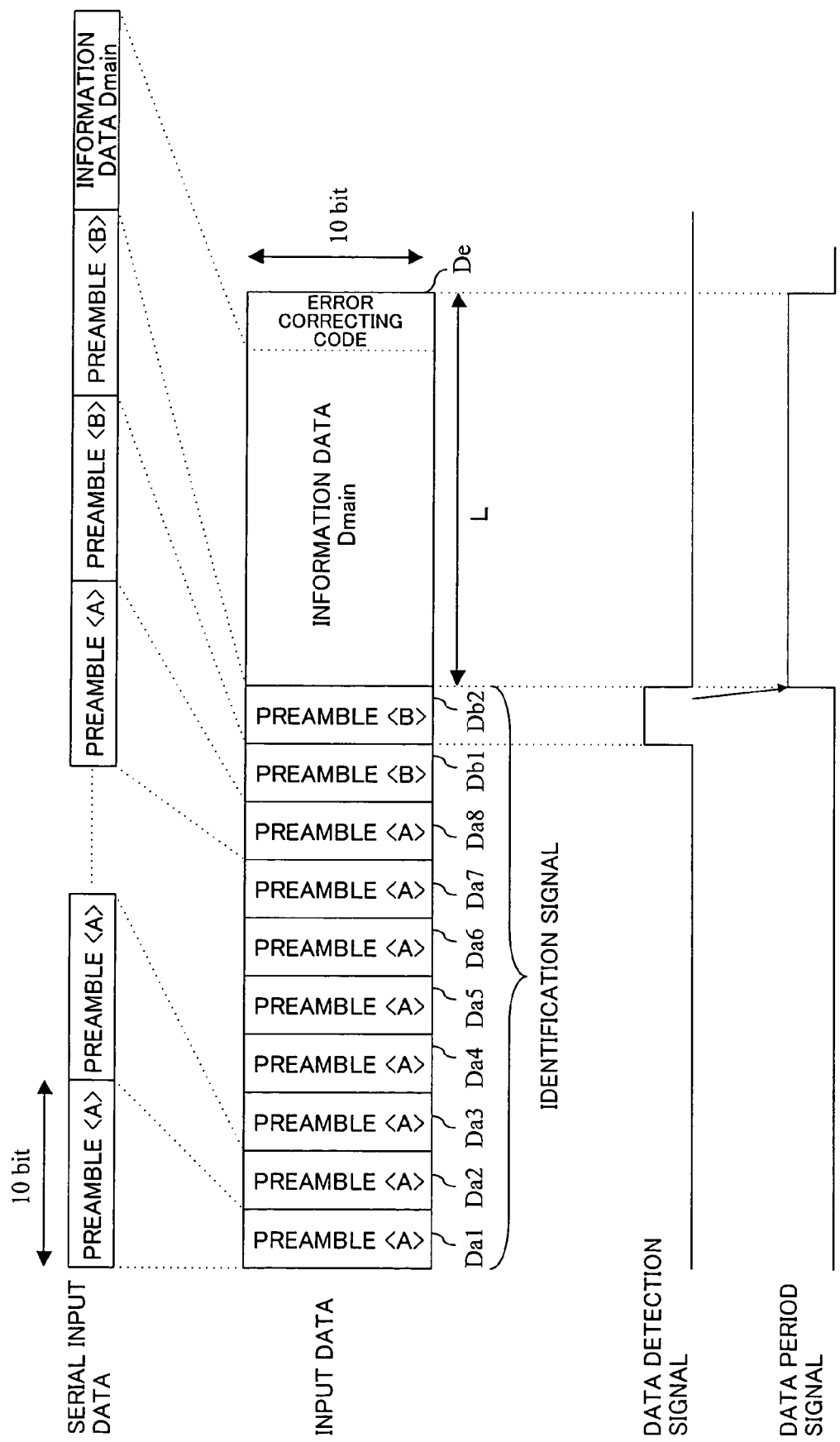

FIG. 3A

ERROR PATTERN GROUP 1

| | ERROR PATTERN | DATA DETECTION SIGNAL |
|---|---|---|
| P101 | 1 1 1 1 1 1 1 1 1 | 1 |
| P102 | 0 1 1 1 1 1 1 1 1 | 1 |
| P103 | 1 0 1 1 1 1 1 1 1 | 1 |
| P104 | 1 1 0 1 1 1 1 1 1 | 1 |
| P105 | 1 1 1 0 1 1 1 1 1 | 1 |
| P106 | 1 1 1 1 0 1 1 1 1 | 1 |
| P107 | 1 1 1 1 1 0 1 1 1 | 1 |
| P108 | 1 1 1 1 1 1 0 1 1 | 1 |
| P109 | 1 1 1 1 1 1 1 0 1 | 1 |
| P110 | 1 1 1 1 1 1 1 1 0 | 1 |
| P111 | 1 1 1 1 1 1 1 1 0 | 1 |
| | OTHERS | 0 |

FIG. 3B

ERROR PATTERN GROUP 2

| | ERROR PATTERN | DATA DETECTION SIGNAL |
|---|---|---|
| P201 | 1 1 1 1 1 1 1 0 0 | 1 |
| P202 | 1 1 1 1 1 1 0 0 1 | 1 |
| P203 | 1 1 1 1 1 0 0 1 1 | 1 |
| P204 | 1 1 1 1 0 0 1 1 1 | 1 |
| P205 | 1 1 1 0 0 1 1 1 1 | 1 |
| P206 | 1 1 0 0 1 1 1 1 1 | 1 |
| P207 | 1 0 0 1 1 1 1 1 1 | 1 |
| P208 | 1 0 0 1 1 1 1 1 1 | 1 |
| P209 | 0 0 1 1 1 1 1 1 1 | 1 |
| P210 | 1 1 1 1 1 1 0 1 0 | 1 |
| P211 | 1 1 1 1 1 0 1 1 0 | 1 |
| P212 | 1 1 1 1 0 1 1 1 0 | 1 |
| P213 | 1 1 1 0 1 1 1 1 0 | 1 |
| P214 | 1 1 0 1 1 1 1 1 0 | 1 |
| P215 | 1 0 1 1 1 1 1 1 0 | 1 |
| P216 | 1 0 1 1 1 1 1 1 0 | 0 |
| P217 | 0 1 1 1 1 1 1 1 0 | 1 |
| ⋮ | ⋮ | ⋮ |
| P245 | 1 1 1 1 1 0 1 0 1 | 1 |
| | THREE OR MORE ERRORS | 0 |

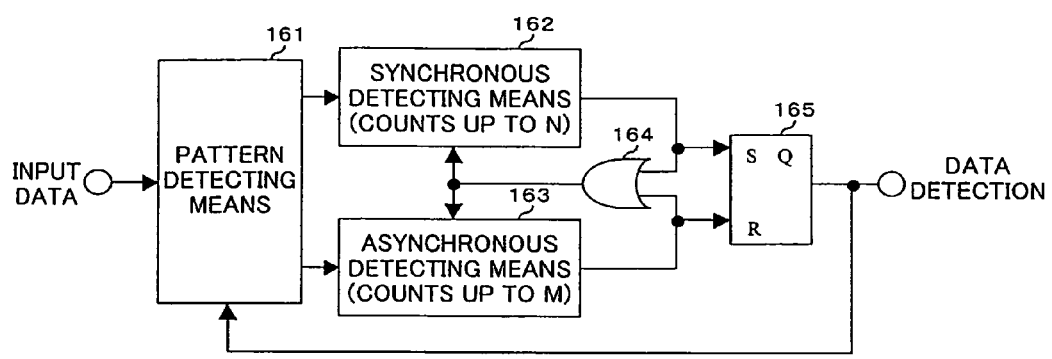
FIG. 22 -- *PRIOR ART* --

DATA DETECTOR AND MULTI-CHANNEL DATA DETECTOR

CROSS-REFERENCE TO RELATED APPLICATION

This application claims priority under 35 U.S.C. § 119 on Japanese Patent Application No. 2004-067863 filed on Mar. 10, 2004, the entire contents of which are hereby referenced.

BACKGROUND OF THE INVENTION

1. Field of the Invention

The present invention relates to a data detector and a multi-channel data detector for extracting required data from received data.

2. Description of the Related Art

Japanese Patent Laid-Open Publication No. 60-91739 describes a data detector. As shown in FIG. 22, this data detector includes a pattern detecting means 161, a synchronous detecting means 162, an asynchronous detecting means 163, an OR means 164, and a flip-flop 165. Input data which is applied to the pattern detecting means 161 is formed from a frame synchronization pattern and data. A frame synchronization pattern is a special pattern string which is periodically present in every frame so that data is synchronized. The pattern detecting means 161 detects whether or not a frame synchronization pattern is present in the received input data. The pattern detecting means 161 outputs a match signal if a frame synchronization pattern is present. Otherwise, the pattern detecting means 161 outputs a mismatch signal. The synchronous detecting means 162 counts the match signals from the pattern detecting means 161. The asynchronous detecting means 163 counts the mismatch signals from the pattern detecting means 161. When the match signal is output N times in a row, the synchronous detecting means 162 sets the flip-flop 165 to 1, switching the mode to a synchronous mode. At the same time, the synchronous detecting means 162 resets the respective counters of the synchronous detecting means 162 and the asynchronous detecting means 163 through the OR means 164.

When the mismatch signal is output M times in a row in the synchronous mode, the asynchronous detecting means 163 resets the flip-flop 165 to zero, switching the mode to an asynchronous mode. At the same time, the asynchronous detecting means 163 resets the respective counters of the synchronous detecting means 162 and the asynchronous detecting means 163 through the OR means 164.

When the mode is switched to the synchronous mode, data in the input data can be accurately detected based on the frame synchronization pattern. The frame synchronization pattern is present periodically. Therefore, the synchronous mode can be maintained as long as the pattern detecting means 161 detects a frame synchronization pattern after the cycle of the previous frame synchronization pattern.

SUMMARY OF THE INVENTION

The above conventional structure requires periodic detection of an identification signal (frame synchronization pattern). If there is no periodic synchronization pattern like a frame synchronization pattern, an identification signal cannot be accurately detected and therefore data cannot be accurately extracted.

Moreover, data may be subjected to bit errors or a difference in delay (skew) due to a transmission path. Such defects in the data caused by a transmission path or the like may prevent accurate detection of the data. For example, bit errors may disturb detection of an identification signal, and a skew may shift the timing of extracting the data.

The present invention is made to solve the foregoing problems, and it is an object of the present invention to provide a data detector and a multi-channel data detector which are capable of accurately detecting required data even when data has defects.

According to one aspect of the present invention, a data detector detects an identification signal of a prescribed format from N-bit wide parallel input data (where N is a natural number). The data detector includes P first comparing sections (where P is a natural number), Q second comparing sections (where Q is a natural number), and a determining section. Each of the P first comparing sections compares one of first P data of continuous (P+Q) data in the parallel input data with a first pattern. Each of the Q second comparing sections compares one of Q data following the P data with a second pattern. The determining section determines whether the identification signal has been detected or not according to a comparison result of the P first comparing sections and a comparison result of the Q second comparing sections.

In the parallel input data, a plurality of N-bit data of N-bit wide and one-bit long are continuously arranged in the lengthwise direction. The identification signal is formed from continuous (P+Q) N-bit data. Each of the first P N-bit data of the identification signal has the first pattern. Each of Q N-bit data following the P N-bit data of the identification signal has the second pattern. The determining section of the data detector determines whether the identification signal has been detected or not based on the comparison result of the plurality of comparing sections adapted to the identification signal. It is herein assumed that the P first comparing sections compare the first P N-bit data of the identification signal with the first pattern, and the Q second comparing sections compare Q N-bit data following the P N-bit data of the identification signal with the second pattern. In this case, each of the P first comparing sections determines that the received N-bit data matches the first pattern, and each of the Q second comparing sections determines that the received N-bit data matches the second pattern. The determining section determines that the identification signal has been detected when all of the P first comparing sections determine that the received N-bit data matches the first pattern and all of the Q second comparing sections determine that the received N-bit data matches the second pattern. The identification signal can thus be detected. Alternatively, the determining section may determine whether or not the number of first and second comparing sections which have determined that the received N-bit data does not match the prescribed pattern is less than a prescribed value. The first comparing sections and the second comparing sections may determine whether or not at least a prescribed number of bits of the received N-bit data match the prescribed pattern. The determining section may alternatively determine whether or not the number of first and second comparing sections which have determined that the number of matching bits is less than the prescribed value is less than a prescribed value. As a result, the identification signal can be accurately detected without using powerful error correction even when data has bit errors. For example, the identification signal can be accurately detected and the data can be accurately extracted even if bit errors are generated due to a defective transmission path.

Preferably, the above data detector further includes (P+Q) data holding sections which are connected in series. The first data holding section of the (P+Q) data holding sections receives the parallel input data in synchronization with a prescribed timing. Each of the remaining data holding sections holds data held in the previous data holding section in synchronization with the prescribed timing. Each of the P first comparing sections compares data held in a corresponding one of the first P data holding sections of the (P+Q) data holding sections with the first pattern. Each of the Q second comparing sections compares data held in a corresponding one of the remaining Q data holding sections of the (P+Q) data holding sections with the second pattern.

With the plurality of stages of data holding sections, the above data detector can sequentially receive the parallel input data N bits by N bits from the beginning of the parallel input data.

Preferably, each of the P first comparing sections determines whether or not one of the P data matches the first pattern. Each of the Q second comparing sections determines whether or not one of the Q data matches the second pattern. The determining section determines that the identification signal has been detected when a total number of the first comparing sections which have determined that one of the P data does not match the first pattern and the second comparing sections which have determined that one of the Q data does not match the second pattern is less than a prescribed value.

In the above data detector, the determining section determines that the identification signal has been detected not only when all of the first and second comparing sections have determined that the received data matches a prescribed pattern but also when the number of first and second comparing sections which have determined that the received data does not match the prescribed pattern is less than the prescribed value. In other words, the determining section determines that the identification signal has been detected as long as the number of first and second comparing sections which have determined that the received data does not match the prescribed pattern is less than the prescribed value. As a result, the identification signal can be detected even when data has bit errors.

Preferably, each of the P first comparing sections compares one of the P data with the first pattern to determine whether or not a number of matching bits is equal to or larger than a prescribed value. Each of the Q second comparing sections compares one of the Q data with the second pattern to determine whether or not a number of matching bits is equal to or larger than a prescribed value. The determining section determines that the identification signal has been detected when all of the P first comparing sections have determined that the number of matching bits is equal to or larger than the prescribed value as well as all of the Q second comparing sections have determined that the number of matching bits is equal to or larger than the prescribed value.

In the above data detector, the determining section determines that the identification signal has been detected not only when all of the first and second comparing sections have determined that the received data completely matches a prescribed pattern but also when all of the first and second comparing sections have determined that the number of matching bits is equal to or larger than the prescribed value. Since the first and second comparing sections determine whether or not at least the prescribed number of bits of the received data match the prescribed pattern, the identification signal can be detected even when data has bit errors.

Preferably, each of the P first comparing sections compares one of the P data with the first pattern to determine whether or not a number of matching bits is equal to or larger than a prescribed value. Each of the Q second comparing sections compares one of the Q data with the second pattern to determine whether or not a number of matching bits is equal to or larger than a prescribed value. The determining section determines that the identification signal has been detected when a total number of the first comparing sections which have determined that the number of matching bits is less than the prescribed value and the second comparing sections which have determined that the number of matching bits is less than the prescribed value is less than a prescribed value.

In the above data detector, the first and second comparing sections do not determine whether or not the received data completely matches the prescribed pattern. Instead, the first and second comparing sections determine whether or not at least the prescribed number of bits of the received data match the prescribed pattern. Moreover, the determining section does not determine whether or not all of the first and second comparing sections have determined that at least the prescribed number of bits of the received data match the prescribed pattern. Instead, the determining section determines whether or not at least the prescribed number of first and second comparing sections have determined that at least the prescribed number of bits of the received data match the prescribed pattern. As a result, the identification signal can be detected even when the data has bit errors.

Preferably, the determining section determines whether the identification signal has been detected or not based on comparison between a comparison result pattern (a pattern of a length (P+Q) obtained from a comparison result of the P first comparing sections and a comparison result of the Q second comparing sections) and a third pattern.

Preferably, the above data detector further includes an error-rate detecting section. The error-rate detecting section detects an error rate of the parallel input data. The determining section changes the third pattern to be compared with the comparison result pattern, according to the error rate detected by the error-rate detecting section.

In the above data detector, the third pattern which is used by the determining section is changed according to the error rate. As a result, misdetection possibility can further be reduced.

Preferably, the above data detector further includes an error-rate detecting section. The error-rate detecting section detects an error rate of the parallel input data. The first comparing sections change the first pattern according to the error rate detected by the error-rate detecting section. The second comparing sections change the second pattern according to the error rate detected by the error-rate detecting section.

In the above data detector, the first pattern which is used by the first comparing sections and the second pattern which is used by the second comparing section are changed according to the error rate. As a result, misdetection possibility can further be reduced.

Preferably, the data detector further includes a first error correcting section and a second error correcting section. The first error correcting section compares the received parallel input data with a third pattern. The first error correcting section outputs the third pattern as the parallel input data when a number of matching bits is equal to or larger than a prescribed value, and outputs the parallel input data when the number of matching bits is less than the prescribed value. The second error correcting section compares the received parallel input data with a fourth pattern. The second error correcting section outputs the fourth pattern as the parallel input data when a number of matching bits is equal to or larger than a prescribed value, and outputs the parallel input data when the number of matching bits is less than the prescribed value. Each of the P first comparing sections compares one of the first P data of the continuous (P+Q) data in the parallel input data received through the first error correcting section with the first pattern. Each of the Q second comparing sections compares one of the Q data following the P data in the parallel input data received through the second error correcting section with the second pattern.

In the above data detector, the first error correcting section and the second error correcting section output a prescribed pattern as the parallel input data when the identification signal has bit errors. In other words, the first error correcting section and the second error correcting section correct the identification signal having bit errors to a correct identification signal. Accordingly, the identification signal can be accurately detected with a simple structure without conducting error correction using a redundant error correcting code. The determining section may determine whether or not the number of first and second comparing sections which have determined that the received data does not match the prescribed pattern is less than a prescribed value. The first comparing sections and the second comparing sections may determine whether or not at least a prescribed number of bits of the received data match the prescribed pattern. The determining section may alternatively determine whether or not the number of first and second comparing sections which have determined that the number of matching bits is less than the prescribed value is less than a prescribed value. As a result, the identification signal can be detected even if bit errors are not completely corrected by the first and second error correcting sections.

Preferably, the data detector further includes an error-rate detecting section. The error-rate detecting section detects an error rate of the parallel input data. The first error-rate detecting section and the second error-rate detecting section change the respective prescribed value according to the error rate detected by the error-rate detecting section.

In the above data detector, the respective prescribed value which is used in the first and second comparing sections is changed according to the error rate. As a result, misdetection possibility can further be reduced.

According to another aspect of the present invention, a multi-channel data detector corrects a difference in delay in K input data (where K is a natural number). Each of the K input data includes an identification signal of a prescribed format. The multi-channel data detector includes K first identification-signal detecting sections, K delaying sections, K skew correcting sections, K second identification-signal detecting sections, and a skew determining section. The K first identification-signal detecting sections correspond to the K input data. The K delaying sections correspond to the K input data. The K skew correcting sections correspond to the K input data. The K second identification-signal detecting sections correspond to the K delaying sections. Each of the K first identification-signal detecting sections detects the identification signal from corresponding input data. Each of the K delaying sections delays corresponding input data. Each of the K second identification-signal detecting sections detects the identification signal from the input data delayed by a corresponding delaying section. The skew determining section determines a difference in delay in the K input data based on a timing the K first identification-signal detecting sections and the K second identification-signal detecting sections detect the identification signal. Each of the K skew correcting sections adjusts a delay amount of corresponding input data according to the difference in delay determined by the skew determining section.

In the above multi-channel data detector, the beginning of data to be extracted from input data can be detected by detecting the identification signal. When there is a difference in delay between a plurality of input data, the timing of the beginning of data to be extracted is different between the plurality of input data. The skew determining section therefore determines the difference in delay in the K input data by determining the difference in timing of the beginning of data to be extracted. For example, if the skew determining section determines that second input data is one clock behind first input data, the skew correcting section corresponding to the first input data delays the first input data by one clock cycle. In this way, the difference in delay between channels can be corrected with a simple structure, whereby the data can be accurately extracted.

Preferably, each of the K skew correcting sections selects corresponding input data or input data delayed by a corresponding delaying section, according to the difference in delay determined by the skew determining section.

According to still another aspect of the present invention, a multi-channel data detector corrects a difference in delay in K input data (where K is a natural number). Each of the K input data includes an identification signal of a prescribed format. The multi-channel data detector includes K identification-signal detecting sections, K skew correcting sections, and a skew determining section. The K identification-signal detecting sections correspond to the K input data. The K skew correcting sections correspond to the K input data. Each of the K identification-signal detecting sections detects the identification signal from corresponding input data. The skew determining section determines a difference in delay in the K input data based on a timing the K identification-signal detecting sections detects the identification signal. Each of the K skew correcting sections adjusts a delay amount of corresponding input data according to the difference in delay determined by the skew determining section.

In the above multi-channel data detector, the beginning of data to be extracted from input data can be detected by detecting the identification signal. When there is a difference in delay between a plurality of input data, the timing of the beginning of data to be extracted is different between the plurality of input data. The skew determining section therefore determines the difference in delay in the K input data by determining the difference in timing of the beginning of data to be extracted. For example, if the skew determining section determines that second input data is one clock behind first input data, the skew correcting section corresponding to the first input data delays the first input data by one clock cycle. In this way, the difference in delay between channels can be corrected with a simple structure.

Preferably, each of the K identification-signal detecting sections outputs a data detection signal upon detection of an identification signal from corresponding input data. The skew determining section includes K delaying sections and a skew detecting section. The K delaying sections correspond to the K identification-signal detecting sections. Each of the K delaying sections delays a data detection signal from a corresponding identification-signal detecting section. The skew detecting section detects a difference in delay (skew) in the K input data based on the data detection signals from the K identification-signal detecting sections and the data detection signals from the K delaying sections. Each of the K skew correcting sections stores corresponding input data when a corresponding identification-signal detecting section detects an identification signal from the corresponding input data, and outputs the stored input data based on the difference in delay detected by the skew detecting section.

Preferably, each of the identification-signal detecting sections outputs a data detection signal upon detection of an identification signal from corresponding input data. The skew determining section includes K delaying sections and a skew detecting section. The K delaying sections correspond to the K identification-signal detecting sections. Each of the K delaying sections delays a data detection signal from a corresponding identification-signal detecting section. The skew detecting section detects a difference in delay (skew) in the K input data based on the data detection signals from the K identification-signal detecting sections and the data detection signals from the K delaying sections. Each of the K skew correcting sections includes a delaying section and a selecting section. The delaying section delays corresponding input data. The selecting section selects corresponding input data or input data delayed by the delaying section, according to the difference in delay detected by the skew detecting section.

Preferably, each of the K input data is N-bit wide parallel input data (where N is a natural number). Each of the identification-signal detecting sections includes P first comparing sections (where P is a natural number), Q second comparing sections (where Q is a natural number) and a determining section. Each of the P first comparing sections compares one of first P data of continuous (P+Q) data in the input data with a first pattern. Each of the Q second comparing sections compares one of Q data following the P data with a second pattern. The determining section determines whether the identification signal has been detected or not according to a comparison result of the P first comparing sections and a comparison result of the Q second comparing sections.

In the above multi-channel data detector, the identification signal can be detected by the determining section even when input data has bit errors. The difference in delay (skew) can therefore be corrected by using these signals.

Preferably, each of the K input data is N-bit wide parallel input data (where N is a natural number). Each of the identification-signal detecting sections includes P first comparing sections (where P is a natural number), Q second comparing sections (where Q is a natural number) and a determining section. Each of the P first comparing sections compares one of first P data of continuous (P+Q) data in the input data with a first pattern. Each of the Q second comparing sections compares one of Q data following the P data with a second pattern. The determining section determines whether the identification signal has been detected or not according to a comparison result of the P first comparing sections and a comparison result of the Q second comparing sections.

In the above multi-channel data detector, the identification signal can be detected by the determining section even when input data has bit errors. Therefore, the difference in delay (skew) can be corrected by using these signals. As a result, data can be accurately extracted.

Preferably, the above data detector further includes a first error correcting section and a second error correcting section. The first error correcting section compares the received parallel input data with the first pattern. The first error correcting section outputs the first pattern as the parallel input data when the number of matching bits is equal to or larger than a prescribed value, and outputs the parallel input data when the number of matching bits is less than the prescribed value. The second error correcting section compares the received parallel input data with the second pattern. The second error correcting section outputs the second pattern as the parallel input data when the number of matching bits is equal to or larger than a prescribed value, and outputs the parallel input data when the number of matching bits is less than the prescribed value. The first data holding section of the (P+Q) data holding sections receives the parallel input data through the first error correcting section and the second error correcting section.

In the above data detector, the first error correcting section and the second error correcting section output a prescribed pattern as the parallel input data when the identification signal has bit errors. In other words, the first error correcting section and the second error correcting section correct the identification signal having bit errors to a correct identification signal. Accordingly, the identification signal can be accurately detected with a simple structure without conducting error correction using a redundant error correcting code. The determining section may determine whether or not the number of first and second comparing sections which have determined that the received data does not match the prescribed pattern is less than a prescribed value. The first comparing sections and the second comparing sections may determine whether or not at least a prescribed number of bits of the received data match the prescribed pattern. The determining section may alternatively determine whether or not the number of first and second comparing sections which have determined that the number of matching bits is less than the prescribed value is less than a prescribed value. As a result, the identification signal can be detected even if bit errors are not completely corrected by the first and second error correcting sections.

In this way, the identification signal can be accurately detected without using powerful error correction even when data has bit errors. For example, the identification signal can be accurately detected and the data can be accurately extracted even if bit errors are generated due to a defective transmission path.

Moreover, the difference in delay (skew) between channels can be corrected with a simple structure, whereby data can be accurately extracted.

Moreover, the identification signal can be detected by the determining section even when input data has bit errors. The difference in delay (skew) can therefore be corrected by using these signals. As a result, data can be accurately extracted.

BRIEF DESCRIPTION OF THE DRAWINGS

FIG. 2 shows the structure of input data;

FIGS. 3A and 3B show examples of error patterns;

FIG. 22 is a block diagram showing the structure of a conventional data detector.

DESCRIPTION OF THE PREFERRED EMBODIMENTS

Figure 1:
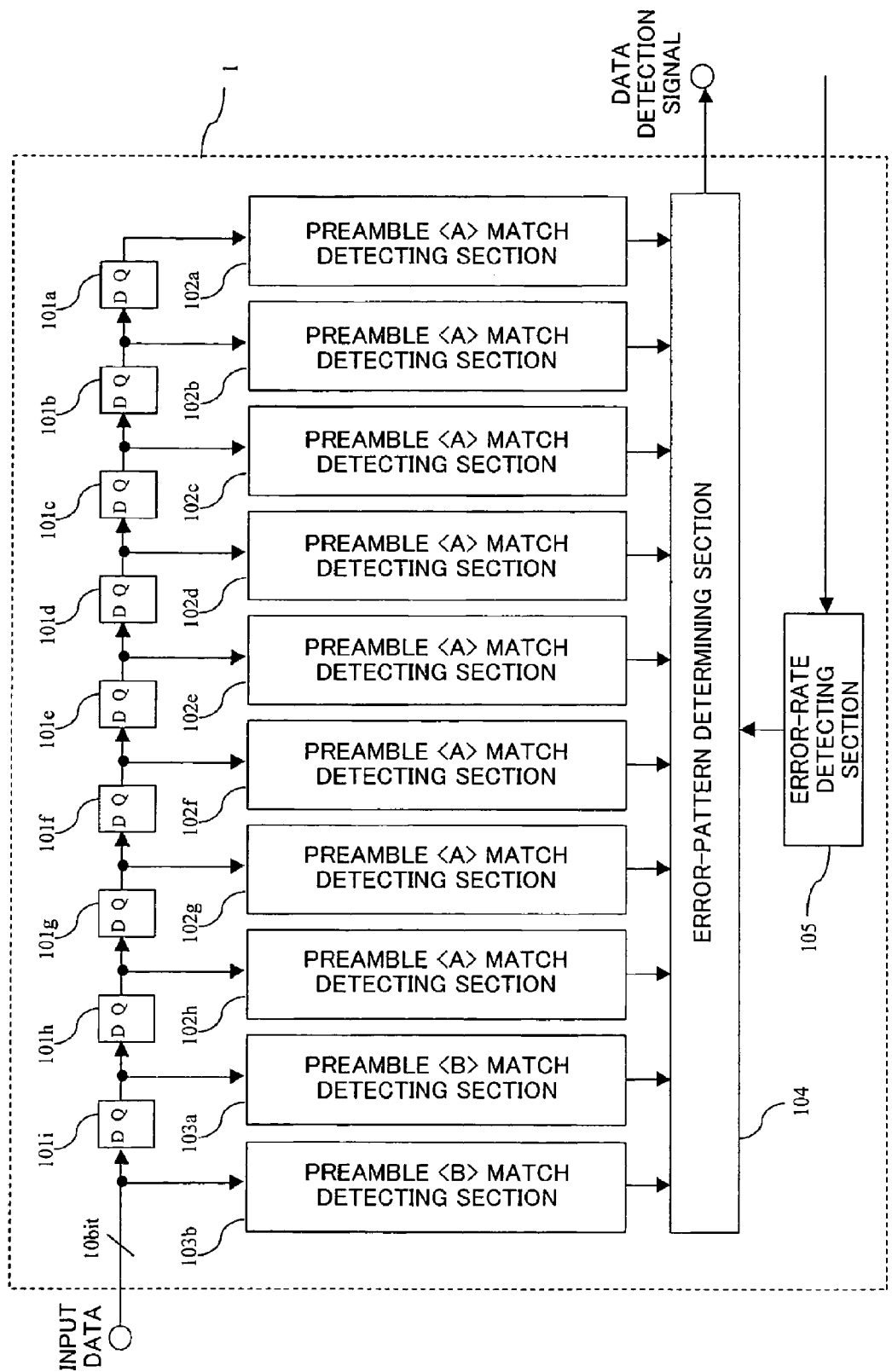
FIG. 1 is a block diagram showing the overall structure of a data detector according to a first embodiment of the present invention.

Hereinafter, embodiments of the present invention will be described in detail with reference to the accompanying drawings. Note that the same or corresponding portions are denoted with the same reference numerals and characters throughout the figures, and description thereof will not be repeated.

First Embodiment

[Overall Structure]

FIG. 1 shows the overall structure of a data detector 1 according to the first embodiment of the present invention. The data detector 1 detects an identification signal from data having an identification signal of a prescribed format added thereto (hereinafter, this data is referred to as input data Data). The data detector 1 includes flip-flops 101a to 101i, preamble <A> match detecting sections 102a to 102h, preamble <B> match detecting sections 103a, 103b, an error-pattern determining section 104 and an error-rate detecting section 105. Each flip-flop 101a to 101i receives the first ten bits of input data Data (hereinafter, the first ten bits of input data Data are referred to as input data Dx) and outputs previously stored input data Dx in response to a clock. Each preamble <A> match detecting section 102a to 102h outputs a match detection signal (i.e., outputs "1") if the bit values of input data Dx from a corresponding one of the flip-flops 101a to 101i match a preamble <A> match pattern stored in that preamble <A> match detecting section. Otherwise, the preamble <A> match detecting section 102a to 102h does not output a match detection signal (i.e., outputs "0"). The preamble <B> match detecting section 103b outputs a match detection signal (i.e., outputs "1") if the bit values of the first ten bits of input data Data (i.e., the bit values of input data Dx) match a preamble <B> match pattern stored in the preamble <B> match detecting section 103b. Otherwise, the preamble <B> match detecting section 103b does not output a match detection signal (i.e., outputs "0"). The preamble <B> match detecting section 103a outputs a match detection signal (i.e., outputs "1") if the bit values of input data Dx from the flip-flop 101i match a preamble <B> match pattern stored in the preamble <B> match detecting section 103a. Otherwise, the preamble <B> match detecting section 103a does not output a match detection signal (i.e., outputs "0"). The error-pattern determining section 104 outputs a data detection signal if a pattern of the respective output values of the preamble <A> match detecting sections 102a to 102h and the preamble <B> match detecting sections 103a, 103b, i.e., an output value pattern, matches any error pattern stored in the error-pattern determining section 104. The error-rate detecting section 105 controls the error-pattern determining section 104 according to the error rate of input data Data.

[Structure of Input Data Data]

FIG. 2 shows an example of input data Data which is received by the data detector 1 of FIG. 1. The input data Data is 10-bit wide parallel data, and is produced by converting every ten bits of one-bit wide serial data into parallel data. Note that the data width is herein 10 bits because 8-bit data has been converted into 10-bit data by a prescribed conversion algorithm in order to stabilize serial data transmission and to facilitate reproduction of serial clocks. The input data Data is formed from an identification signal and (10×L)-bit information data Dmain (where L is a data length and a natural number). The identification signal is formed from 10-bit preambles <A> Da1 to Da8 and 10-bit preambles <B> Db1, Db2. After detection of the beginning of the information data Dmain, the 10-bit data is restored to 8-bit data by an inverse conversion algorithm which is not shown in FIG. 1.

An error correcting code De may be added at the end of the information data Dmain. For example, a BCH (Bose-Chaudhuri-Hochquenghem) code is known as such an error correcting code De. The error correcting code De is usually produced by performing a prescribed operation to the information data Dmain. Note that the error correction code De is added to the information data Dmain, and is not included in the preambles <A> Da1 to Da8 and the preambles <B> Db1, Db2. The preambles <A> Da1 to Da8 and the preambles <B> Db1, Db2 form an identification signal for detecting the beginning of the information data Dmain, and have a fixed value.

It is herein assumed that a string of the ten bit values of a preamble <A> having no bit error (i.e., a pattern represented by a normal preamble <A>) is Pa[0:9], a string of the ten bit values of a preamble <B> having no bit error (i.e., a pattern represented by a normal preamble <B>) is Pb[0:9], and a string of the ten bit values of actually received 10-bit input data Dx (i.e., a pattern represented by the input data Dx) is Dx[0:9].

Although there are eight preambles <A> and two preambles <B> in the example of FIG. 2, the present invention is not limited to this. There may be P preambles <A> and Q preambles <B> (where P and Q are natural numbers). The preambles <A> and <B> need not be present periodically.

[Preamble <A> Match Pattern and Preamble <B> Match Pattern]

A preamble <A> match pattern stored in each preamble <A> match detecting section 102a to 102h of FIG. 1 is a pattern of a normal preamble <A>, Pa[0:9]. A preamble <B> match pattern stored in each preamble <B> match detecting section 103a, 103b of FIG. 1 is a pattern of a normal preamble <B>, Pb[0:9].

[Error Patterns Stored in the Error-Pattern Determining Section]

FIGS. 3A and 3B show examples of error patterns stored in the error-pattern determining section 104 of FIG. 1. Each error pattern is formed from ten bit values. These ten bit values respectively correspond to the output values of the preamble <B> match detecting section 103b, the preamble <B> match detecting section 103a, the preamble <A> match detecting section 102h . . . and the preamble <A> match detecting section 102a from left to right. Therefore, the rightmost bit value corresponds to the output value of the preamble <A> match detecting section 102a.

The error pattern group 1 shown in FIG. 3A include an error pattern P101 in which all of the ten bit values are "1", and error patterns P102 to P111 in which any one of the ten bit values is "0" and the remaining nine bit values are "1".

The error pattern group 2 shown in FIG. 3B include error patterns P201 to P245 in which any two of the ten bit values are "0" and the remaining eight bit values are "1".

[Operation]

Hereinafter, operation of the data detector 1 shown in FIG. 1 will be described.

First, the flip-flop 101i and the preamble <B> match detecting section 103b receive the first ten bits of input data Data (input data Dx1).

The preamble <B> match detecting section 103b compares bit values Dx1[0:9] of the received input data Dx1 with a preamble <B> match pattern Pb[0:9] stored in the preamble <B> match detecting section 103b. The preamble <B> match detecting section 103b outputs "1" to the error-pattern determining section 104 if the bit values Dx1[0:9] match the preamble <B> match pattern Pb[0:9]. Otherwise, the preamble <B> match detecting section 103b outputs "0" to the error-pattern determining section 104.

The flip-flop 101i then receives the first ten bits of input data Data (input data Dx2) and outputs the previously received input data Dx1 to the flip-flop 101h and the preamble <B> match detecting section 103a in response to a clock. The preamble <B> match detecting section 103b also receives the first ten bits of the input data Data (input data Dx2), and compares bit values Dx2[0:9] of the received input data Dx2 with the preamble <B> match pattern Pb[0:9] stored in the preamble <B> match detecting section 103b. The preamble <B> match detecting section 103b outputs "1" to the error-pattern determining section 104 if the bit values Dx2[0:9] match the preamble <B> match pattern Pb[0:9]. Otherwise, the preamble <B> match detecting section 103b outputs "0" to the error-pattern determining section 104.

The flip-flop 101h receives the input data Dx1 from the flip-flop 101i in response to a clock. The preamble <B> match detecting section 103a compares the bit values Dx1[0:9] of the input data Dx1 received from the flip-flop 101i with a preamble <B> match pattern Pb[0:9] stored in the preamble <B> match detecting section 103a. The preamble <B> match detecting section 103a outputs "1" to the error-pattern determining section 104 if the bit values Dx1[0:9] match the preamble <B> match pattern Pb[0:9]. Otherwise, the preamble <B> match detecting section 103a outputs "0" to the error-pattern determining section 104.

Each of the flip-flops 101a to 101i thus sequentially shifts the input data Data ten-bits by ten-bits to a flip-flop of the subsequent stage in response to every clock. As a result, the preamble <A> match detecting sections 102a to 102h and the preamble <B> match detecting sections 103a, 103b sequentially receive the input data Data ten-bits by ten-bits.

The error-pattern determining section 104 determines whether or not an output value pattern of the preamble <A> match detecting sections 102a to 102h and the preamble <B> match detecting sections 103a, 103b matches any error pattern stored in the error-pattern determining section 104. The output value pattern is a pattern represented by the respective output values (ten output values) of the preamble <A> match detecting sections 102a to 102h and the preamble <B> match detecting sections 103a, 103b. The error-pattern determining section 104 outputs a data detection signal if the output value pattern matches any error pattern stored in the error-pattern determining section 104. Otherwise, the error-pattern determining section 104 does not output a data detection signal.

For example, an apparatus of the subsequent stage produces a data period signal which is held at "1" for the same period as the period L of the information data Dmain based on the data detection signal, as shown in FIG. 2. As a result, the period of the information data Dmain can be accurately extracted from the input data Data.

The data detector 1 thus extracts the information data Dmain by detecting the beginning of the information data Dmain from the input data Data.

[Operation of the Error-Pattern Determining Section 104]

Hereinafter, operation of the error-pattern determining section 104 will be described according to the types of error pattern group stored in the error-pattern determining section 104.

(i) When the error-pattern determining section 104 stores the error pattern group 1 (FIG. 3A):

When the data detector 1 receives input data Data having no bit error, all of the preamble <A> match detecting sections 102a to 102h and the preamble <B> match detecting sections 103a, 103b output "1". Since the pattern represented by these output values matches the error pattern P101 of the error pattern group 1, the error-pattern determining section 104 outputs a data detection signal.

When the data detector 1 receives input data Data having bit errors in any one of the preambles <A> Da1 to Da8 and preambles <B> Db1, Db2, one of the preamble <A> match detecting sections 102a to 102h and preamble <B> match detecting sections 103a, 103b outputs "0", and the remaining nine match detecting sections output "1". For example, if the input data Data has bit errors in the preamble <A> Da5, the output values will be "1111101111" in the order from the preamble <B> match detecting section 103b to the preamble <A> match detecting section 102a. Since the pattern represented by these output values matches the error pattern P107 of the error pattern group 1, the error-pattern determining section 104 outputs a data detection signal.

The data detector 1 can thus accurately detect the beginning of data even when a plurality of bit errors burst in a single preamble <A> or a single preamble <B>.

(ii) When the error-pattern determining section 104 stores the error pattern group 1 and the error pattern group 2 (FIG. 3B):

When the data detector 1 receives input data Data having bit errors in any two of the preambles <A> Da1 to Da8 and preambles <B> Db1, Db2, two of the preamble <A> match detecting sections 102a to 102h and preamble <B> match detecting sections 103a, 103b output "0", and the remaining eight match detecting sections output "1". For example, if the output values are "1111111001" in the order from the preamble <B> match detecting sections 103b to the preamble <A> match detecting section 102a, the pattern represented by these output values matches the error pattern P202 of the error pattern group 2. Therefore, the error-pattern determining section 104 outputs a data detection signal.

The use of the error pattern groups 1, 2 of FIGS. 3A, 3B thus enables accurate detection of an identification signal without using powerful error correction even when input data has bit errors.

[Misdetection Possibility]

Hereinafter, the possibility that the error-pattern determining section 104 erroneously outputs a data detection signal when the data detector 1 has not completely received an identification signal (preambles <A> Da1 to Da8 and preambles <B> Db1, Db2) will be described.

It is herein assumed that input data Data having no bit error is sequentially applied to the data detector 1, and the preamble <A> match detecting sections 102b to 102h have received the preambles <A> Da1 to Da7, respectively, the preamble <B> match detecting section 103a has received the preamble <A> Da8, and the preamble <B> match detecting section 103b has received the preamble <B> Db1. In other words, it is assumed that the data detector 1 has received the preambles <A> Da1 to Da8 and the preamble <B> Db1, but has not received the preamble <B> Db2.

In this case, the preamble <A> match detecting section 102a outputs "0". Since the preamble <B> match detecting section 103a has received the preamble <A> Da8, the preamble <B> match detecting section 103a outputs "0". Since the preamble <A> match detecting sections 102b to 102h have received the preambles <A> Da1 to Da7, respectively, and the preamble <B> match detecting section 103b has received the preamble <B> Db1, all of the preamble <A> match detecting sections 102b to 102h and preamble <B> match detecting section 103b output "1". In other words, the pattern represented by the output values (the output value pattern) is "1011111110" in the order from the preamble <B> match detecting section 103b to the preamble <A> match detecting section 102a.

None of the error patterns P101 to P111 in the error pattern group 1 of FIG. 3A matches this output value pattern, and the error pattern P216 in the error pattern group 2 of FIG. 3B matches this output value pattern. The error-pattern determining section 104 therefore does not output a data detection signal.

Misdetection can thus be prevented by using two kinds of match detecting sections (preamble <A> match detecting sections 102a to 102h and preamble <B> match detecting sections 103a, 103b).

[Operation of the Error-Rate Detecting Section]

Hereinafter, operation of the error-rate detecting section 105 of FIG. 1 will be described.

The error-rate detecting section 105 receives information data Dmain and an error correcting code De which have been detected by the above operation.

The error-rate detecting section 105 then produces data for detecting an error rate (hereinafter, referred to as error-rate detecting data Dk) by performing to the received information data Dmain the same operation as that performed to produce the error correcting code De.

The error-rate detecting section 105 compares the bit values of the error-rate detecting data Dk with the bit values of the error correcting code De having no bit error (i.e., the bit values of a normal error correcting code De), and detects the number of matching bit values.

If the number of matching bit values is equal to or larger than a threshold, the error-rate detecting section 105 outputs to the error-pattern determining section 104 a selection signal for selecting the error pattern group 1. If the number of matching bit values is less than the threshold, the error-rate detecting section 105 outputs to the error-pattern determining section 104 a selection signal for selecting the error pattern group 2.

According to the selection signal from the error-rate detecting section 105, the error-pattern determining section 104 selects one of the error pattern groups in order to use the selected error pattern group in the above operation.

The error-rate detecting section 105 thus detects the error rate by comparing the bit values of the error-rate detecting data Dk with the bit values of a normal error correcting code De.

[First Modification of the Error-Rate Detecting Section]

The error-rate detecting section 105 may alternatively detect the error rate by using fixed data transmitted through the same transmission path as input data Data. For example, the error rate may be detected as follows:

The data detector 1 receives input data Data with fixed data of prescribed bit values added thereto.

The error-rate detecting section 105 receives the fixed data and compares the bit values of the received fixed data with the bit values of fixed data having no bit error (i.e., the bit values of normal fixed data).

If the number of matching bit values is equal to or larger than a threshold, the error-rate detecting section 105 outputs to the error-pattern determining section 104 a selection signal for selecting the error pattern group 1. If the number of matching bit values is less than the threshold, the error-rate detecting section 105 outputs to the error-pattern determining section 104 a selection signal for selecting the error pattern group 2.

The error-rate detecting section 105 thus detects the error rate by comparing the bit values of the received fixed data with the bit values of normal fixed data.

[Second Modification of the Error-Rate Detecting Section]

A section for detecting error-rate detecting data (hereinafter, referred to as data detecting section) may be connected before the error-rate detecting section 105 of FIG. 1. The data detecting section has the same structure as the data detector 1 of FIG. 1 except that the data detecting section does not include the error-rate detecting section 105. For example, the error rate may be detected as follows:

The data detecting section receives input data Data and detects an identification signal by the operation described above. Upon detection of the identification signal, the data detecting section outputs a data detection signal to the error-rate detecting section 105.

The error-rate detecting section 105 produces a data period signal which is held at "1" for the same period as the period L of information data Dmain based on the data detection signal. The period of the information data Dmain is thus extracted from the input data Data based on the data period signal.

As described above, the error-rate detecting section 105 produces error-rate detecting data Dk by performing to the extracted information data Dmain the same operation as that performed to produce the error correcting code De. The error-rate detecting section 105 then detects the error rate by comparing the bit values of the produced error-rate detecting data Dk with the bit values of a normal error correcting code De.

[Effects]

As described above, the error-pattern determining section 104 uses a plurality of error patterns for comparison with an output value pattern of the preamble <A> detecting sections and the preamble <B> detecting sections. Accordingly, an identification signal can be accurately detected without using powerful error correction even when input data has bit errors. As a result, an apparatus of the subsequent stage can accurately extract information data Dmain.

Misdetection can be prevented by using two kinds of match detecting sections for two kinds of identification data (preambles <A> Da1 to Da8 and preambles <B> Db1, Db2).

Possibility of misdetection can further be reduced by selecting the error pattern group 1 or the error pattern group 2 in the error-pattern determining section 104 according to the error rate.

By increasing the number of error patterns, the data detector 1 can operate in the same manner even if any three or more of the preamble <A> match detecting sections 102a to 102h and preamble <B> match detecting sections 103a, 103b output "0". In this case, such error patterns are used that any three of the ten bit values are "0" and the remaining seven bit values are "1". However, an error pattern like P216 of FIG. 3B should be included in order to prevent misdetection.

Second Embodiment

[Overall Structure]

Figure 4:
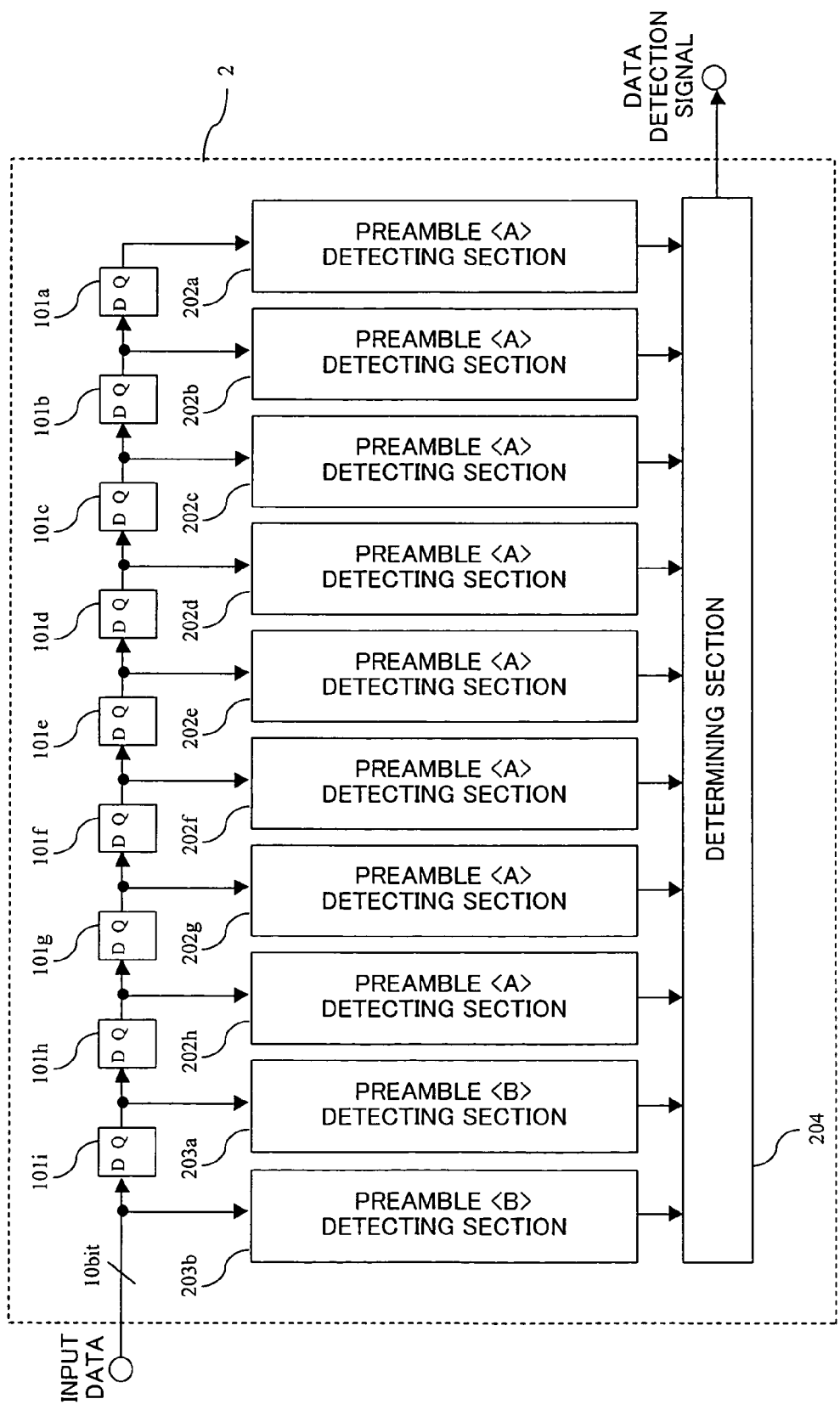
FIG. 4 is a block diagram showing the overall structure of a data detector according to a second embodiment of the present invention.

FIG. 4 shows the overall structure of a data detector 2 according to the second embodiment of the present invention. The data detector 2 has the same structure as the data detector 1 of FIG. 1 except that the preamble <A> match detecting sections 102a to 102h, the preamble <B> match detecting sections 103a, 103b, the error-pattern determining section 104 and the error-rate detecting section 105 of FIG. 1 are replaced with preamble <A> detecting sections 202a to 202h, preamble <B> detecting sections 203a, 203b and a determining section 204. Each preamble <A> detecting section 202a to 202h outputs a detection signal (i.e., outputs "1") when the bit values of received ten bits of input data (i.e., the bit values of input data Dx) match a preamble <A> similar pattern stored in that preamble <A> detecting section. Each preamble <B> detecting section 203a, 203b outputs a detection signal (i.e., outputs "1") when the bit values of received ten bits of input data (i.e., the bit values of input data Dx) match a preamble <B> similar pattern stored in that preamble <B> detecting section. The determining section 204 outputs a data detection signal when all of the preamble <A> detecting sections 202a to 202h and preamble <B> detecting sections 203a, 203b output "1".

[Internal Structure of the Preamble <A> Detecting Sections]

Figure 5:
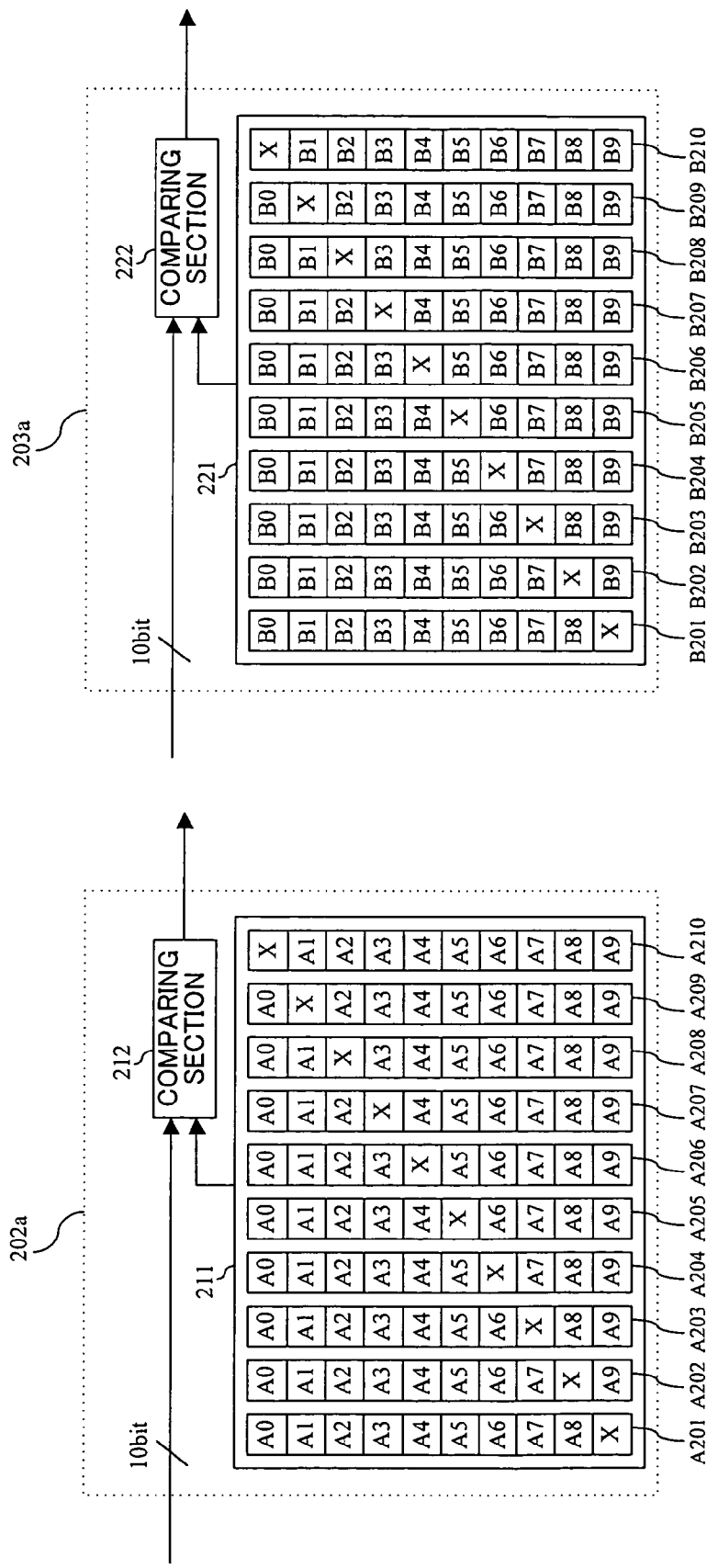
FIG. 5A is a block diagram showing the internal structure of a preamble <A> detecting section in FIG. 4.
FIG. 5B is a block diagram showing the internal structure of a preamble <B> detecting section in FIG. 4.

FIG. 5A shows the internal structure of the preamble <A> detecting sections 202a to 202h of FIG. 4. Since the preamble <A> detecting sections 202a to 202h have the same internal structure, the internal structure of the preamble <A> detecting structure 202a is shown in FIG. 5A. The preamble <A> detecting section 202a includes a comparison table 211 and a comparing section 212. The comparison table 211 stores preamble <A> similar patterns A201 to A210. The comparing section 212 outputs a detection signal (i.e., outputs "1") when received input data Dx matches any one of the preamble <A> similar patterns A201 to A210 stored in the comparison table 211.

[Internal Structure of the Preamble <B> Detecting Sections]

FIG. 5B shows the internal structure of the preamble <B> detecting sections 203a, 203b of FIG. 4. Since the preamble <B> detecting sections 203a, 203b have the same internal structure, the internal structure of the preamble <B> detecting structure 203a is shown in FIG. 5B. The preamble <B> detecting section 203a includes a comparison table 221 and a comparing section 222. The comparison table 221 stores preamble <B> similar patterns B201 to B210. The comparing section 222 outputs a detection signal (i.e., outputs "1") when received input data Dx matches any one of the preamble <B> similar patterns B201 to B210 stored in the comparison table 221.

[Preamble <A> Similar Patterns and Preamble <B> Similar Patterns]

The preamble <A> similar patterns A201 to A210 stored in the comparison table 211 of FIG. 5A will now be described. Provided that the bit values Pa[0:9] of a normal preamble <A> is A0, A1, A2, ..., A9 in this order, each of the preamble <A> similar patterns A201 to A210 is a pattern having one of the bit values A0 to A9 replaced with a bit value X. The bit value X is an arbitrary bit value (the bit value X may be either "0" or "1"). For example, the preamble <A> similar pattern A203 is a preamble <A> match pattern having a bit value A7 replaced with a bit value X. In other words, the eighth bit value of the preamble <A> similar pattern A203 is an arbitrary bit value.

The preamble <B> similar patterns B201 to B210 stored in the comparison table 221 of FIG. 5B will now be described. Provided that the bit values Pb[0:9] of a normal preamble <B> is B0, B1, B2, ..., B9 in this order, each of the preamble <B> similar patterns B201 to B210 is a pattern having one of the bit values B0 to B9 replaced with a bit value X. The bit value X is an arbitrary bit value (the bit value X may be either "0" or "1"). For example, the preamble <B> similar pattern B203 is a preamble <B> match pattern having a bit value B7 replaced with a bit value X. In other words, the eighth bit value of the preamble <B> similar pattern B203 is an arbitrary bit value.

[Operation]

Hereinafter, operation of the data detector 2 of FIG. 4 will be described.

Like the first embodiment, each of the flip-flops 101a to 101i sequentially shifts the input data Data ten-bits by ten-bits to a flip-flop of the subsequent stage in response to every clock. As a result, the preamble <A> detecting sections 202a to 202h and the preamble <B> detecting sections 203a, 203b sequentially receive the input data Data ten-bits by ten-bits.

In each preamble <A> detecting section 202a to 202h, the comparing section 212 compares the preamble <A> similar patterns A201 to A210 stored in the comparison table 211 with received input data Dx. The comparing section 212 outputs a detection signal (i.e., outputs "1") when any one of the preamble <A> similar patterns A201 to A210 matches the input data Dx.

In each preamble <B> detecting section 203a, 203b, the comparing section 222 compares the preamble <B> similar patterns B201 to B210 stored in the comparison table 221 with received input data Dx. The comparing section 222 outputs a detection signal (i.e., outputs "1") when any one of the preamble <B> similar patterns B201 to B210 matches the input data Dx.

The determining section 204 outputs a data detection signal when all of the preamble <A> detecting sections 202a to 202h and the preamble <B> detecting sections 203a, 203b output "1".

For example, as shown in FIG. 2, an apparatus of the subsequent stage then produces a data period signal which is held at "1" for the same period as the period L of information data Dmain based on the data detection signal. As a result, the period of the information data Dmain can be accurately extracted from input data Data.

[Operation of the Preamble <A> Detecting Sections]

Hereinafter, operation of the preamble <A> detecting sections 202a to 202h will be described. Since the preamble <A> detecting sections 202a to 202h operate in the same manner, operation of the preamble <A> detecting section 202a will be described.

When input data Data to the data detector 2 has no bit error, the bit values of each preamble <A> Da1 to Da8 represent the bit values Pa[0:9] of a normal preamble <A>. Therefore, upon receiving any of the preambles <A> Da1 to Da8 included in the input data Data, the comparing section 212 determines that the received preamble <A> matches the preamble <A> similar patterns A201 to A210 stored in the comparison table 211. The comparison section 212 therefore outputs "1" to the determining section 204.

When input data Data to the data detector 2 has a one-bit error in the preamble <A> Da2, the preamble <A> Da2 has one wrong bit value and nine correct bit values. For example, if the eighth bit value of the preamble <A> Da2 is wrong, the comparing section 212 determines that the preamble <A> Da2 matches the preamble <A> similar pattern A203 stored in the comparison table 211. The comparing section 212 therefore outputs "1" to the determining section 204.

[Operation of the Preamble <B> Detecting Sections]

Hereinafter, operation of the preamble <B> detecting sections 203a, 203b will be described. Since the preamble <B> detecting sections 203a, 203b operate in the same manner, operation of the preamble <B> detecting section 203a will be described.

When input data Data to the data detector 2 has no bit error, the bit values of each preamble <B> Db1, Db2 represent the bit values Pb[0:9] of a normal preamble <B>. Therefore, upon receiving any of the preambles <B> Db1, Db2 included in the input data Data, the comparing section 222 determines that the received preamble <B> matches the preamble <B> similar patterns B201 to B210 stored in the comparison table 221. The comparison section 222 therefore outputs "1" to the determining section 204.

When input data Data to the data detector 2 has a one-bit error in the preamble <B> Db1, the preamble <B> Db1 has one wrong bit value and nine correct bit values. For example, if the eighth bit value of the preamble <B> Db1 is wrong, the comparing section 222 determines that the preamble <B> Db1 matches the preamble <B> similar pattern B203 stored in the comparison table 221. The comparing section 222 therefore outputs "1" to the determining section 204.

[Modification of the Preamble <A> Detecting Sections]

Figure 6:
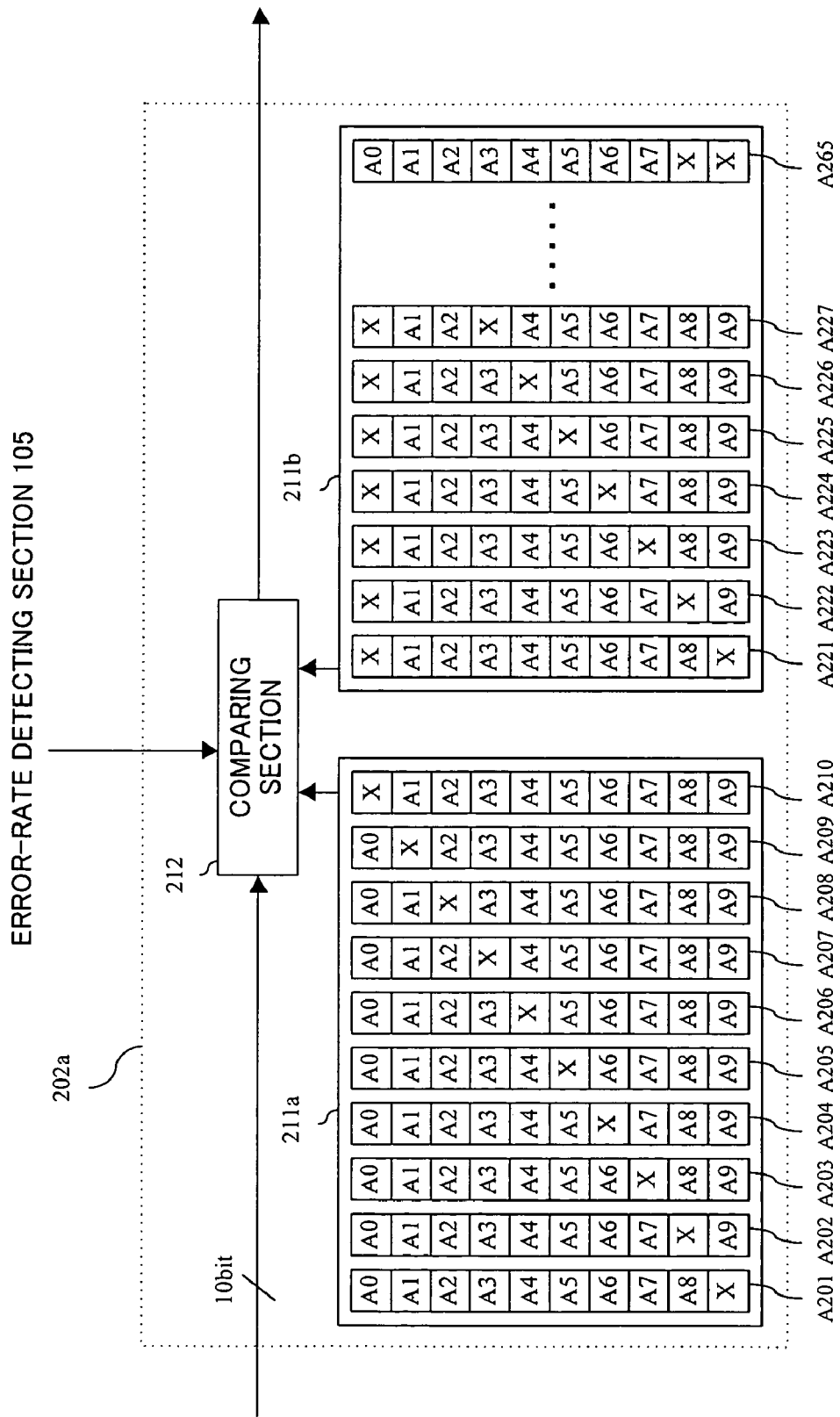
FIG. 6 is a block diagram showing the internal structure of a preamble <A> detecting section in FIG. 4.

Hereinafter, a modification of the preamble <A> detecting sections 202a to 202h will be described. In this modification, the data detector 2 includes the error-rate detecting section 105 shown in FIG. 1, and the preamble <A> detecting sections 202a to 202h receive a selection signal from the error-rate detecting section 105. Since the preamble <A> detecting sections 202a to 202h have the same internal structure, the internal structure of the preamble <A> detecting section 202a is shown in FIG. 6. The preamble <A> detecting section 202a includes comparison tables 211a, 211b and a comparing section 212. The comparison table 211a has the same structure as the comparison table 211 of FIG. 5A. The comparison table 211b stores preamble <A> similar patterns A221 to A265. Each of the preamble <A> similar patterns A221 to A265 is a pattern of a normal preamble <A> having two of bit values A0 to A9 replaced with bit values X. According to a selection signal from the error-rate detecting section 105, the comparing section 212 selects one of the comparison tables 211a, 211b for comparison with the input data Dx.

Operation of the preamble <A> detecting section 202a of FIG. 6 will now be described.

The error-rate detecting section 105 detects the error rate in the same manner as the first embodiment. When the number of matching bits is equal to or larger than a threshold, the error-rate detecting section 105 outputs to the comparing section 212 a selection signal for selecting the comparison table 211a. When the number of matching bits is less than the threshold, the error-rate detecting section 105 outputs to the comparing section 212 a selection signal for selecting the comparison table 211b.

According to the selection signal from the error-rate detecting section 105, the comparing section 212 selects one of the comparison tables 211a, 211b for comparison with the input data Dx.

[Modification of the Preamble <B> Detecting Sections]

Figure 7:
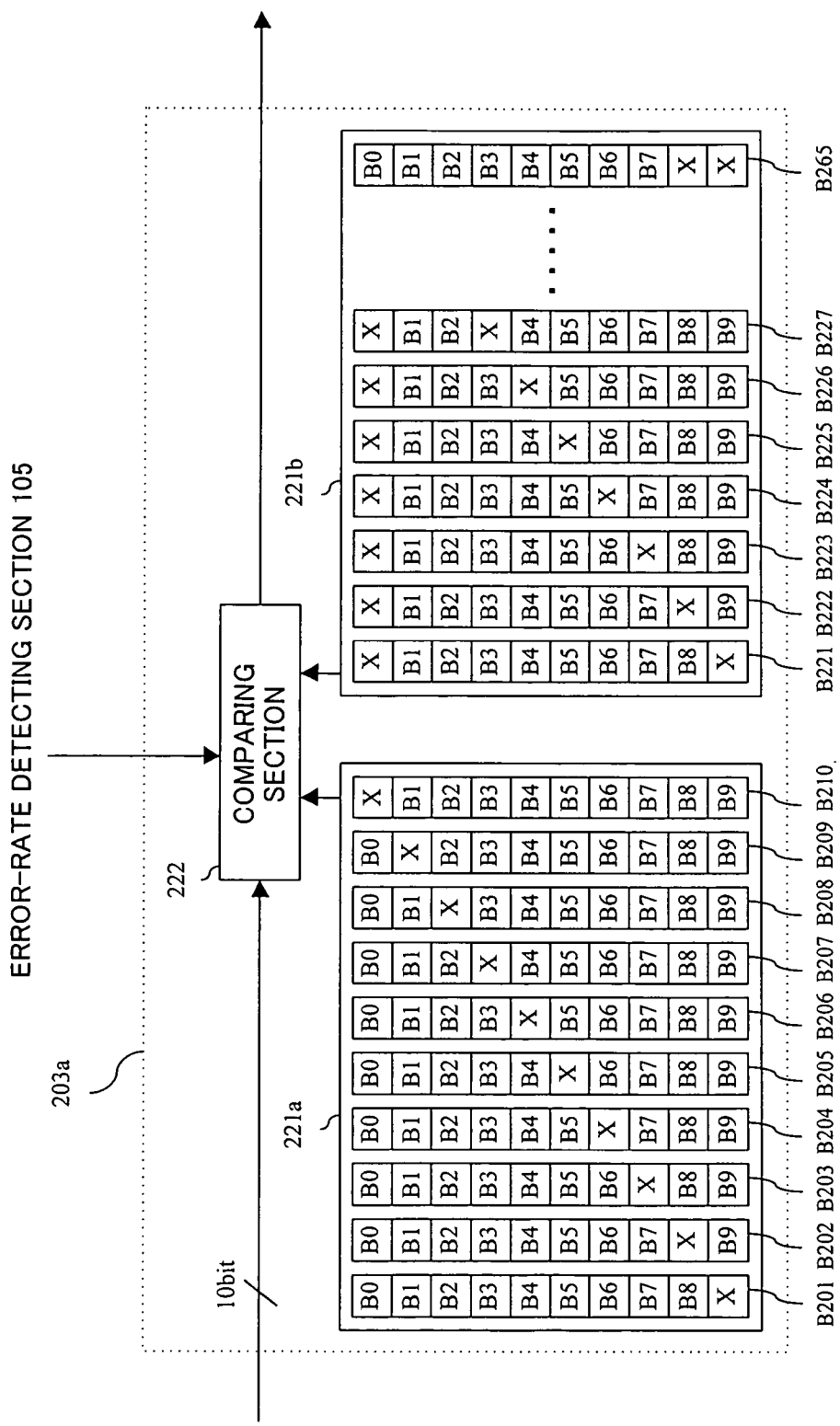
FIG. 7 is a block diagram showing the internal structure of a preamble <B> detecting section in FIG. 4.

A modification of the preamble <B> detecting sections 203a, 203b will now be described. In this modification, the data detector 2 includes the error-rate detecting section 105 shown in FIG. 1, and the preamble <B> detecting sections 203a, 203b receive a selection signal from the error-rate detecting section 105. Since the preamble <B> detecting sections 203a, 203b have the same internal structure, the internal structure of the preamble <B> detecting section 203a is shown in FIG. 7. The preamble <B> detecting section 203a includes comparison tables 221a, 221b and a comparing section 222. The comparison table 221a has the same structure as the comparison table 221 of FIG. 5B. The comparison table 221b stores preamble <B> similar patterns B221 to B265. Each of the preamble <B> similar patterns B221 to B265 is a pattern of a normal preamble <B> having two of bit values B0 to B9 replaced with bit values X. According to a selection signal from the error-rate detecting section 105, the comparing section 222 selects one of the comparison tables 221a, 221b for comparison with the input data Dx.

Like the preamble <A> detecting section 202a of FIG. 6, when each of the preamble <B> detecting sections 203a, 203b includes a plurality of comparison tables (comparison tables 221a, 221b), the comparing section 222 selects one of the comparison tables 221a, 221b for comparison with the input data Dx according to a selection signal from the error-rate detecting section 105.

[Effects]

As has been described above, each of the preamble <A> detecting sections 202a to 202h and preamble <B> detecting sections 203a, 203b uses a plurality of preamble <A> similar patterns or a plurality of preamble <B> similar patterns for comparison with the received input data. Therefore, an identification signal can be accurately detected even when each of the preambles <A> Da1 to Da8 and preambles <B> Db1, Db2 has a one-bit error.

When the preamble <A> detecting sections and the preamble <B> detecting sections have the internal structure shown in FIGS. 6 and 7, misdetection possibility can further be reduced by switching the comparison tables according to the error rate.

Third Embodiment

[Overall Structure]

Figure 8:
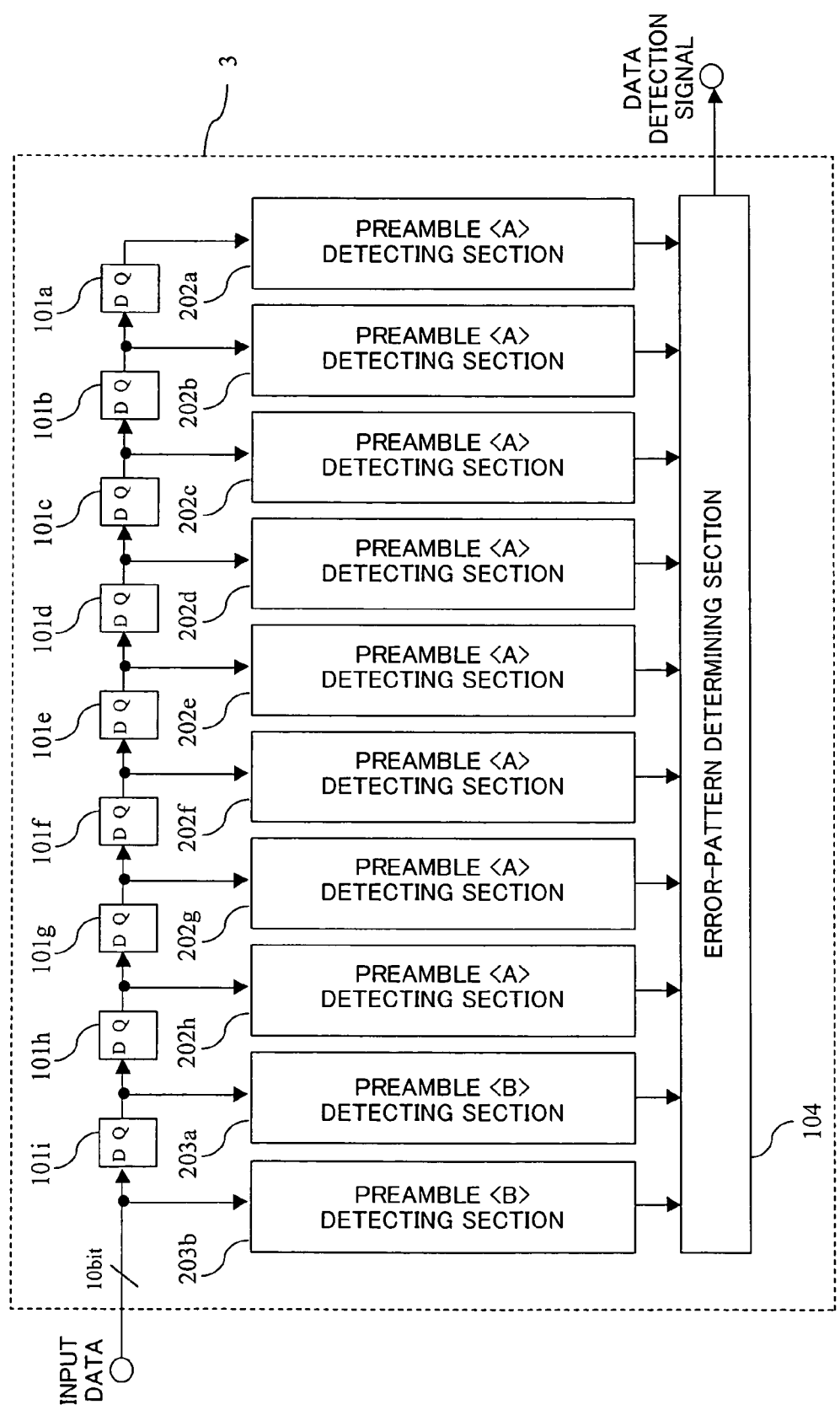
FIG. 8 is a block diagram showing the overall structure of a data detector according to a third embodiment of the present invention.

FIG. 8 shows the overall structure of a data detector 3 according to the third embodiment of the present invention. The data detector 3 has the same structure as the data detector 2 of FIG. 4 except that the determining section 204 of FIG. 4 is replaced with the error-pattern determining section 104 of FIG. 1.

[Operation]

Hereinafter, operation of the data detector 3 of FIG. 8 will be described.

Like the second embodiment, each of the flip-flops 101a to 101i sequentially shifts the input data Data ten-bits by ten-bits to a flip-flop of the subsequent stage in response to every clock. As a result, the preamble <A> detecting sections 202a to 202h and the preamble <B> detecting sections 203a, 203b sequentially receive the preambles <A> Da1 to Da8 and the preambles <B> Db1, Db2. In each preamble <A> detecting section 202a to 202h, the comparing section 212 outputs a detection signal (i.e., outputs "1") when any one of the preamble <A> similar patterns A201 to A210 stored in the comparison table 211 matches the received input data Dx. In each preamble <B> detecting section 203a, 203b, the comparing section 222 outputs a detection signal (i.e., outputs "1") when any one of the preamble <B> similar patterns B201 to B210 stored in the comparison table 221 matches the received input data Dx.

Like the first embodiment, the error-pattern determining section 104 outputs a data detection signal when the pattern represented by the respective output values of the preamble <A> detecting sections 202a to 202h and the preamble <B> detecting sections 203a, 203b matches any error pattern stored in the error-pattern determining section 104.

The above operation will now be described specifically. In the example described below, the error-pattern determining section 104 stores the error pattern group 1 of FIG. 3A.

It is herein assumed that the data detector 3 receives input data Data having a one-bit error in each of the preambles <A> Da1, Da3 to Da8 and preambles <B> Db1, Db2 and a two-bit error in the preamble <A> Da2. In this case, the preamble <A> detecting sections 202a, 202c to 202h and the preamble <B> detecting sections 203a, 203b output "1", and the preamble <A> detecting section 202b outputs "0". The pattern represented by these output values (the output value pattern) is therefore "1111111101" in the order from the preamble <B> detecting section 203b to the preamble <A> detecting section 202a. This output value pattern matches the error pattern P110 stored in the error-pattern determining section 104. The error-pattern determining section 104 therefore outputs a detection signal. In this way, even when each of the preambles <A> Da1 to Da8 and preambles <B> Db1, Db2 has bit errors, one-bit errors can be corrected by the preamble <A> detecting sections 202a to 202h and the preamble <B> detecting sections 203a, 203b. Two-bit or more errors can be corrected by the error-pattern determining section 104, if not 100%.

[Effects]

As has been described above, each of the preamble <A> detecting sections 202a to 202h and preamble <B> detecting sections 203a, 203b uses a plurality of preamble <A> similar patterns or a plurality of preamble <B> similar patterns for comparison with the received input data. Moreover, the error-pattern determining section 104 uses a plurality of error patterns for comparison with an output value pattern of the preamble <A> detecting sections and the preamble detecting sections <B>. As a result, the capability of detecting an identification signal can be improved as compared to the second embodiment.

Note that the error pattern groups 1, 2 of FIGS. 3A, 3B, the comparison tables 211a, 211b of FIG. 6, the comparison tables 221a, 221b of FIG. 7 and the like may be optimized according to the capability of the data detector 3 to detect an identification signal.

It is also to be understood that misdetection possibility can further be reduced by providing a plurality of error pattern groups and a plurality of comparison tables and adaptively switching the error pattern groups and the comparison tables according to the error rate, like the error pattern groups 1, 2 of FIGS. 3A, 3B, the comparison tables 211a, 211b of FIG. 6 and the comparison tables 221a, 221b of FIG. 7.

Fourth Embodiment

[Overall Structure]

Figure 9:
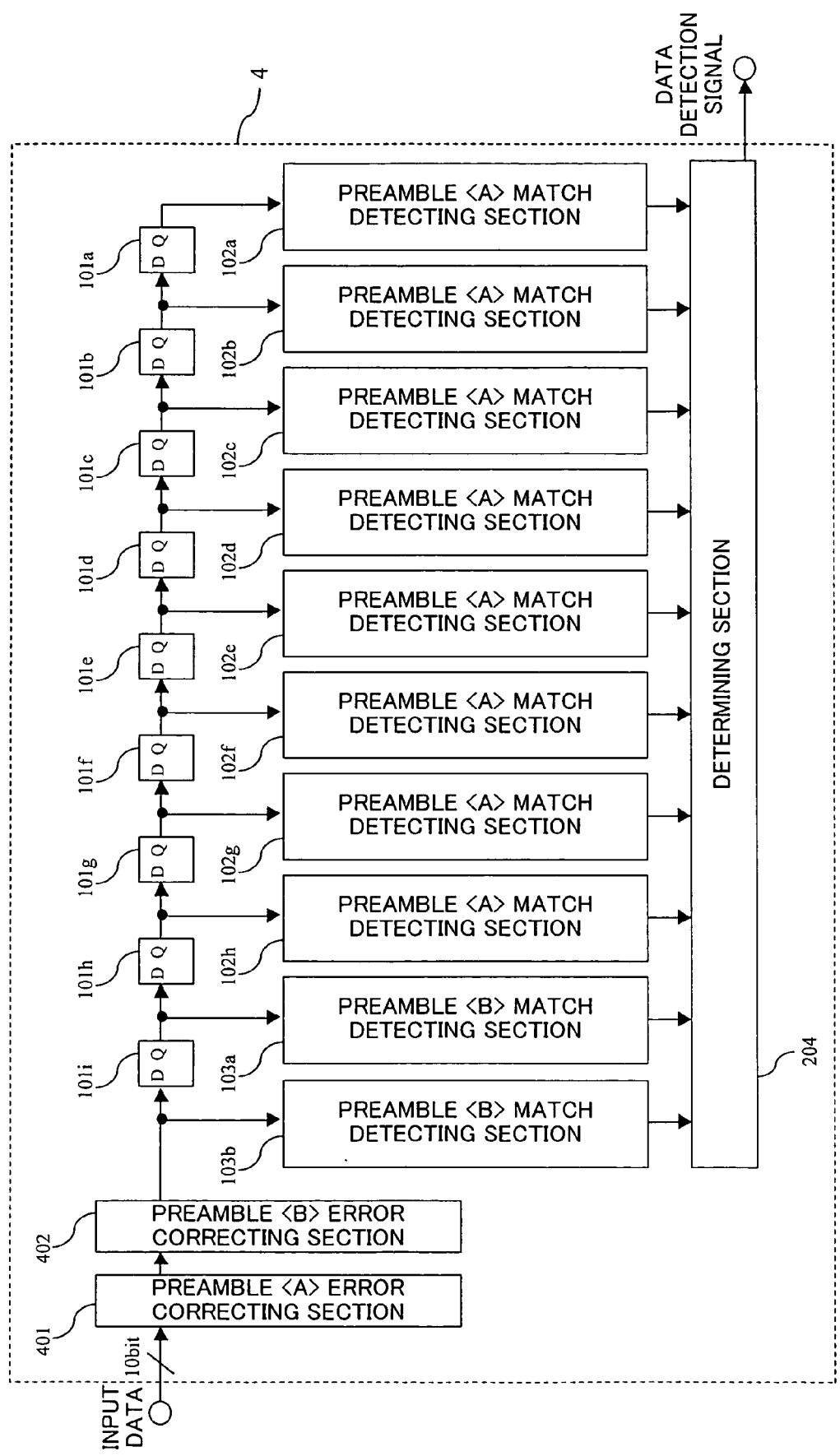
FIG. 9 is a block diagram showing the overall structure of a data detector according to a fourth embodiment of the present invention.

FIG. 9 shows the overall structure of a data detector 4 according to the fourth embodiment of the present invention. The data detector 4 includes flip-flops 101a to 101i, preamble <A> match detecting sections 102a to 102h and preamble <B> match detecting sections 103a, 103b as shown in FIG. 1, a determining section 204 as shown in FIG. 4, a preamble <A> error correcting section 401, and a preamble <B> error correcting section 402. The preamble <A> error correcting section 401 corrects the bit values of a preamble <A> having a bit error to the bit values Pa[0:9] of a normal preamble <A>. The preamble <B> error correcting section 402 corrects the bit values of a preamble <B> having a bit error to the bit values Pb[0:9] of a normal preamble <B>.

[Internal Structure of the Preamble <A> Error Correcting Section 401]

Figure 10:
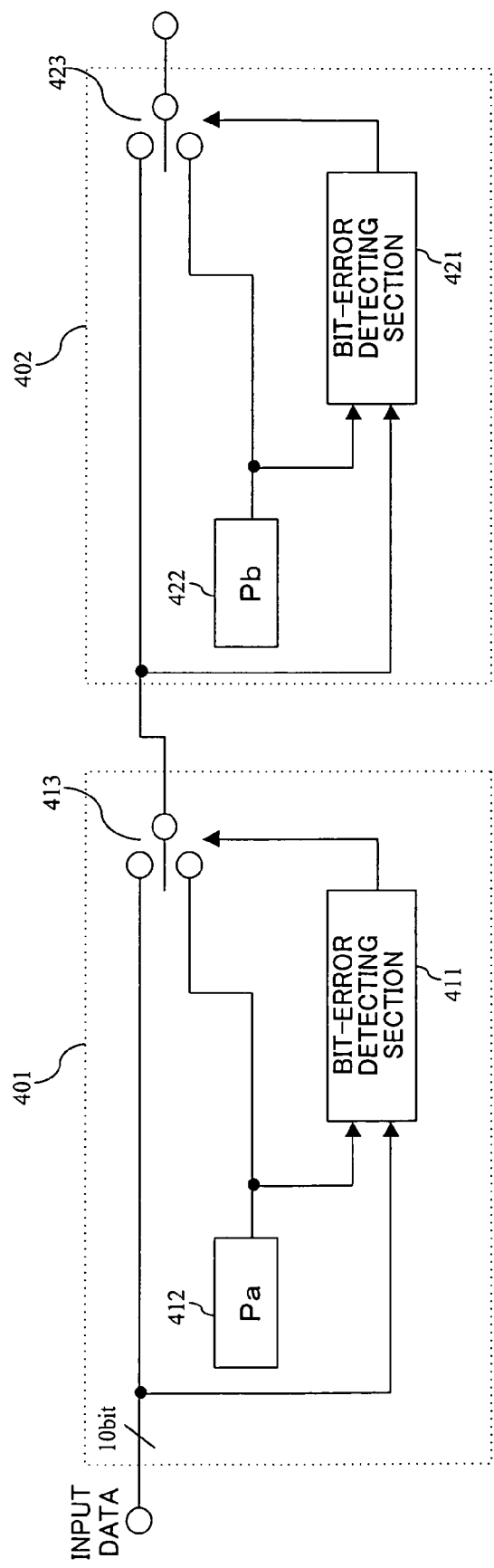
FIG. 10 is a block diagram showing the internal structure of a preamble <A> error correcting section and a preamble <B> error correcting section in FIG. 9.

FIG. 10 shows the internal structure of the preamble <A> error correcting section 401 of FIG. 9. The preamble <A> error correcting section 401 includes a bit-error detecting section 411, a normal preamble <A> storing section 412 and a selecting section 413. The bit-error detecting section 411 has the same structure as the comparing section 212. The bit-error detecting section 411 outputs a switching signal (i.e., outputs "1") to the selecting section 413 when the received 10-bit input data (input data Dx) matches one of the preamble <A> similar patterns A201 to A210 stored in the comparison table 211. The normal preamble <A> storing section 412 stores the bit values of a preamble <A> having no bit error (i.e., the bit values Pa[0:9] of a normal preamble <A>). The selecting section 413 outputs the received input data Dx or the normal preamble <A> stored in the normal preamble <A> storing section 412, according to the switching signal from the bit-error detecting section 411.

[Internal Structure of the Preamble <B> Error Correcting Section 402]

FIG. 10 shows the internal structure of the preamble <B> error correcting section 402 of FIG. 9. The preamble <B> error correcting section 402 includes a bit-error detecting section 421, a normal preamble <B> storing section 422 and a selecting section 423. The bit-error detecting section 421 has the same structure as the comparing section 222. The bit-error detecting section 421 outputs a switching signal (i.e., outputs "1") to the selecting section 423 when the received input data Dx matches one of the preamble <B> similar patterns B201 to B210 stored in the comparison table 221. The normal preamble <B> storing section 422 stores the bit values of a preamble <B> having no bit error (i.e., the bit values Pb[0:9] of a normal preamble <B>). The selecting section 423 outputs the received input data Dx or the normal preamble <B> stored in the normal preamble <B> storing section 422, according to the switching signal from the bit-error detecting section 421.

[Miscorrection Probability]

It is very unlikely that a portion other than the preambles <A> is erroneously corrected to a preamble <A>. The probability that 10-bit input data Dx is erroneously corrected to a preamble <A> is $10/1024$ (about $1/100$). Similarly, it is also very unlikely that a portion other than the preambles <B> is erroneously corrected to a preamble <B>. Since the total number of preambles <A> and preambles <B> is ten, the probability that miscorrection occurs for all preambles is $(1/10)^{20}$. It is therefore considered that such miscorrection hardly occurs.

[Operation]

Hereinafter, operation of the data detector 4 of FIG. 9 will be described.

The bit-error detecting section 411 of the preamble <A> error correcting section 401 receives the first ten bits of input data Data (i.e., input data Dx1), and determines whether or not the bit values Dx1[0:9] of the input data Dx1 match any one of the preamble <A> similar patterns A201 to A201 stored in the bit-error detecting section 411. The bit-error detecting section 411 outputs "1" to the selecting section 413 if the bit values Dx1 [0:9] of the input data Dx1 match any one of the preamble <A> similar patterns A201 to A201. Otherwise, the bit-error detecting section 411 outputs "0" to the selecting section 413.

When the bit-error detecting section 411 outputs "1", the selecting section 413 outputs the bit values Pa[0:9] of a normal preamble <A> stored in the normal preamble <A> storing section 412 as input data Dx1. When the bit-error detecting section 411 outputs "0", the selecting section 413 outputs the received input data Dx1.

The bit-error detecting section 421 of the preamble <B> error correcting section 402 receives the input data Dx1 from the preamble <A> error detecting section 401, and determines whether or not the bit values of the received input data Dx1 match any one of the preamble <B> similar patterns B201 to B210 stored in the bit-error detecting section 421. The bit-error detecting section 421 outputs "1" to the selecting section 423 if the bit values of the received input data Dx1 match any one of the preamble <B> similar patterns B201 to B210. Otherwise, the bit-error detecting section 421 outputs "0" to the selecting section 423.

When the bit-error detecting section 421 outputs "1", the selecting section 423 outputs the bit values Pb[0:9] of a normal preamble <B> stored in the normal preamble <B> storing section 422 as input data Dx1. When the bit-error detecting section 421 outputs "0", the selecting section 423 outputs the received input data Dx1.

Like the first embodiment, each of the flip-flops 101a to 101i sequentially shifts the input data Data ten-bits by ten-bits to a flip-flop of the subsequent stage in response to every clock. As a result, the preamble <A> match detecting sections 102a to 102h and the preamble <B> match detecting sections 103a, 103b sequentially receive the input data Data ten-bits by ten-bits.

Like the second embodiment, the determining section 204 outputs a data detection signal when the determining section 204 determines that all the output values of the preamble <A> match detecting sections 102a to 102h and preamble <B> match detecting sections 103a, 103b are "1".

[Specific Example]

It is herein assumed that input data Data has a one-bit error in each of the preambles <A> Da1 to Da8 and preambles <B> Db1, Db2.

In this case, the preamble <A> error correcting section 401 corrects each of the preambles <A> Da1 to Da8 to the bit values Pa[0:9] of a normal preamble <A>. The preamble <B> error correcting section 402 then corrects each of the preambles <B> Db1, Db2 to the bit values Pb[0:9] of a normal preamble <B>. The preamble <A> match detecting sections 102a to 102h and the preamble <B> match detecting sections 103a, 103b then receive the preambles <A> Da1 to Da8 and the preambles <B> Db1, Db2. In this case, the pattern represented by the output values (i.e., the output value pattern) is "1111111111" in the order from the preamble <B> match detecting section 103b to the preamble <A> match detecting section 102a. As a result, the determining section 204 outputs a data detection signal.

[Effects]

As has been described above, even when each of the preambles <A> Da1 to Da8 and preambles <B> Db1, Db2 has a one-bit error, an identification signal can be accurately detected with a simple structure without conducting error correction using a redundant error correcting code.

In the above example, the preamble <A> error correcting section 401 and the preamble <B> error correcting section 402 correct one-bit errors. However, the same effects can be obtained even when the preamble <A> error correcting section 401 and the preamble <B> error correcting section 402 correct two-bit or more errors. In this case, the bit-error detecting sections 411, 421 need only have the internal structure as shown in FIGS. 6, 7.

Fifth Embodiment

[Overall Structure]

Figure 11:
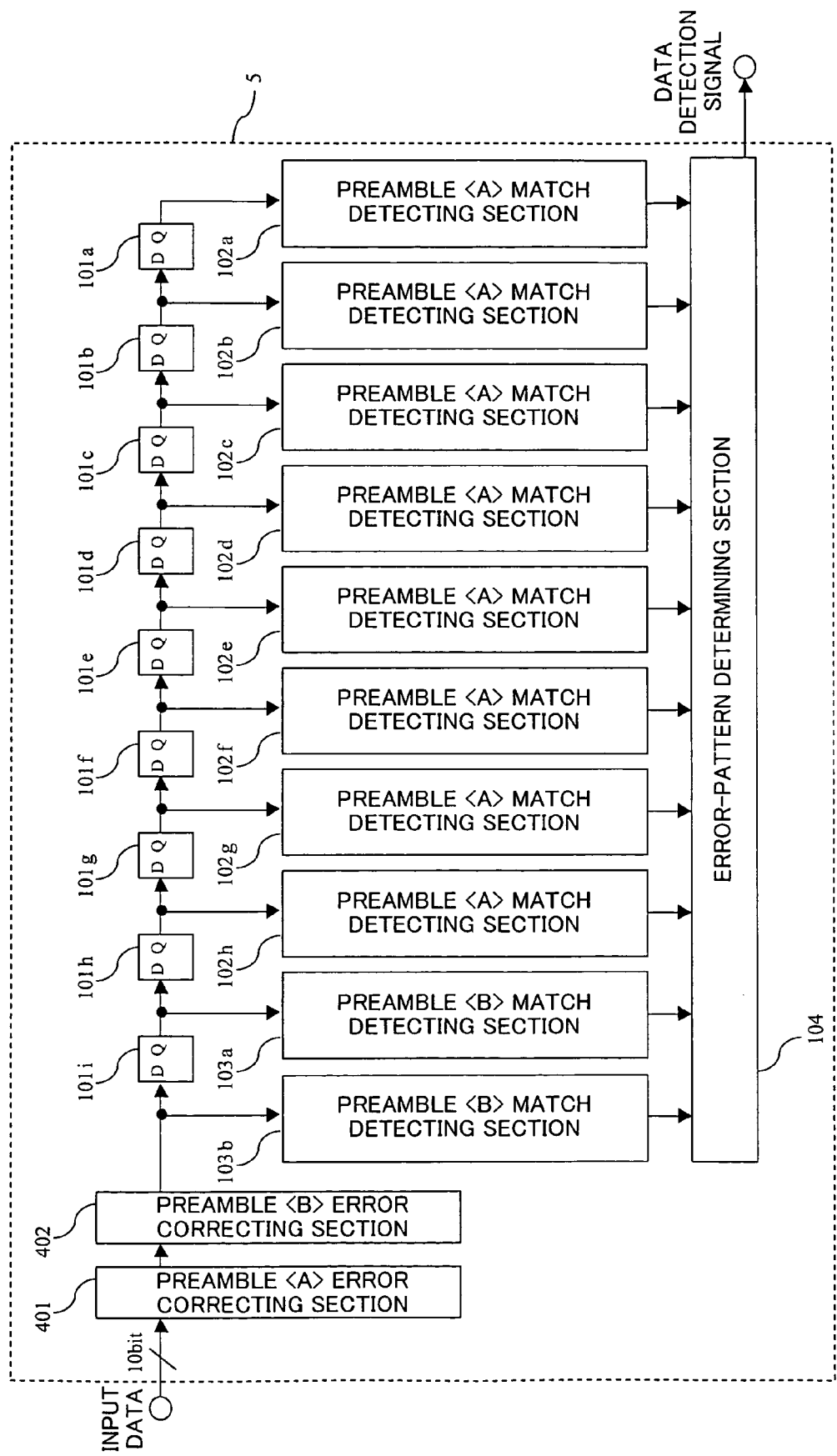
FIG. 11 is a block diagram showing the overall structure of a data detector according to a fifth embodiment of the present invention.

FIG. 11 shows the overall structure of a data detector 5 according to the fifth embodiment of the present invention. The data detector 5 includes the flip-flops 101a to 101i, the preamble <A> detecting sections 102a to 102h, the preamble <B> detecting sections 103a, 103b and the error-pattern determining section 104 as shown in FIG. 1, and the preamble <A> error correcting section 401 and the preamble <B> error correcting section 402 as shown in FIG. 9.

[Operation]

Hereinafter, operation of the data detector 5 of FIG. 11 will be described.

Like the fourth embodiment, the data detector 5 sequentially receives the first ten bits of input data Data.

Like the fourth embodiment, the preamble <A> error correcting section 401 corrects the bit values of each preamble <A> Da1 to Da8 to the bit values Pa[0:9] of a normal preamble <A>. The preamble <B> error correcting section 402 corrects the bit values of each preamble <B> Db1, Db2 to the bit values Pb[0:9] of a normal preamble <B>.

Like the first embodiment, each of the flip-flops 101a to 101i sequentially shifts the input data Data ten-bits by ten-bits to a flip-flop of the subsequent stage in response to every clock. As a result, the preamble <A> match detecting sections 102a to 102h and the preamble <B> match detecting sections 103a, 103b sequentially receive the input data Data ten-bits by ten-bits.

Like the first embodiment, each preamble <A> match detecting section 102a to 102h determines its output value by comparing the received input data with a preamble <A> match pattern stored in that preamble <A> match detecting section. Each preamble <B> match detecting section 103a, 103b determines its output value by comparing the received input data with a preamble <B> match pattern stored in that preamble <B> match detecting section.

Like the first embodiment, the error-pattern determining section 104 determines whether or not the pattern represented by ten output values, i.e., the pattern represented by the respective output values of the preamble <A> match detecting sections 102a to 102h and the preamble <B> match detecting sections 103a, 103b (the output value pattern), matches any error pattern stored in the error-pattern determining section 104. The error-pattern determining section 104 outputs a data detection signal if the output value pattern matches any error pattern stored in the error-pattern determining section 104. Otherwise, the error-pattern determining section 104 does not output a data detection signal.

[Specific Example]

It is herein assumed that the data detector 5 receives input data Data having a one-bit error in each of the preambles <A> Da1 to Da8 and preamble Db2, and a two-bit or more error in the preamble <B> Db1.

In this case, the preamble <A> error correcting section 401 corrects each of the preambles <A> Da1 to Da8 to the bit values Pa[0:9] of a normal preamble <A>. The preamble <B> error correcting section 402 then corrects the preamble <B> Db2 to the bit values Pb[0:9] of a normal preamble <B>. The preamble <A> match detecting sections 102*a* to 102*h* and the preamble <B> match detecting sections 103*a*, 103*b* then receive the preambles <A> Da1 to Da8 and the preambles <B> Db1, Db2. In this case, the pattern represented by the output values (i.e., the output value pattern) is "1011111111" in the order from the preamble <B> match detecting section 103*b* to the preamble <A> match detecting section 102*a*. Since this output value pattern matches the error pattern P103, the error-pattern determining section 104 outputs a data detection signal.

[Effects]

As has been described above, an identification signal can be accurately detected even when bit errors cannot be completely corrected by the preamble <A> error correcting section 401 and the preamble <B> error correcting section 402. The fifth embodiment thus has improved capability of detecting an identification signal over the fourth embodiment.

The number of bits to be corrected by the preamble <A> error correcting section 401 and the preamble <B> error correcting section 402 and the error pattern groups to be used by the error-pattern determining section 104 may be optimized according to the capability of the data detector 5.

Sixth Embodiment

[Overall Structure]

Figure 12:
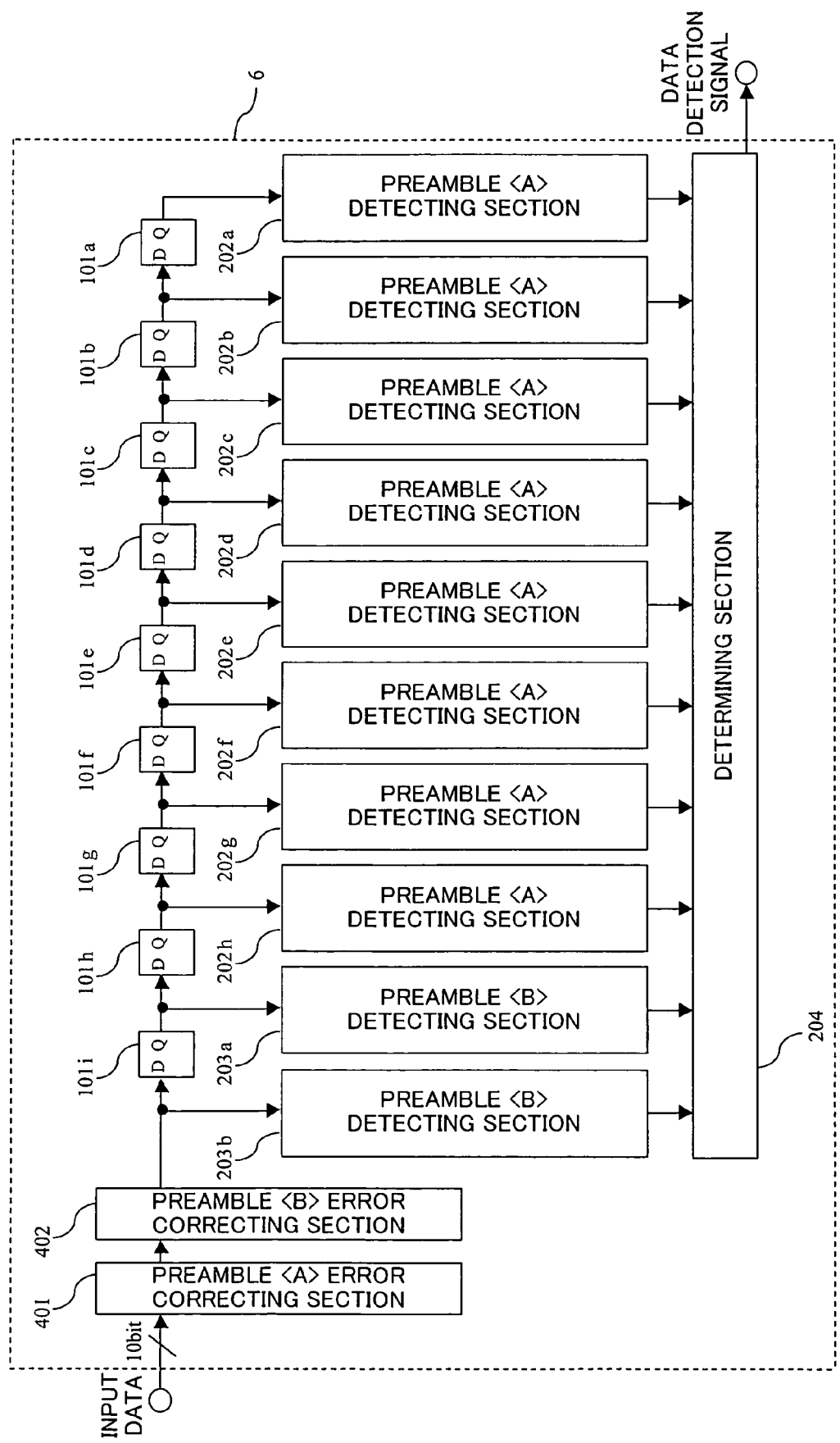
FIG. 12 is a block diagram showing the overall structure of a data detector according to a sixth embodiment of the present invention.

FIG. 12 shows the overall structure of a data detector 6 according to the sixth embodiment of the present invention. The data detector 6 has the same structure as the data detector 2 of FIG. 4 except that the data detector 6 further includes the preamble <A> error correcting section 401 and the preamble <B> error correcting section 402 of FIG. 9.

[Operation]

Hereinafter, operation of the data detector 6 of FIG. 12 will be described.

Like the fourth embodiment, the data detector 6 sequentially receives the first ten bits of input data Data.

Like the fourth embodiment, the preamble <A> error correcting section 401 corrects the bit values of each preamble <A> Da1 to Da8 to the bit values Pa[0:9] of a normal preamble <A>. The preamble <B> error correcting section 402 corrects the bit values of each preamble <B> Db1, Db2 to the bit values Pb[0:9] of a normal preamble <B>.

Like the second embodiment, each of the flip-flops 101*a* to 101*i* sequentially shifts the input data Data ten-bits by ten-bits to a flip-flop of the subsequent stage in response to every clock. As a result, the preamble <A> detecting sections 202*a* to 202*h* and the preamble <B> detecting sections 203*a*, 203*b* sequentially receive the input data Data ten-bits by ten-bits.

Like the second embodiment, each preamble <A> detecting section 202*a* to 202*h* determines its output value by comparing the received input data with the preamble <A> similar patterns A221 to A265 stored in that preamble <A> detecting section. Each preamble <B> detecting section 203*a*, 203*b* determines its output value by comparing the received input data with the preamble <B> similar patterns B221 to B265 stored in that preamble <B> detecting section.

Like the second embodiment, the determining section 204 outputs a data detection signal when all of the ten output values from the preamble <A> detecting sections 202*a* to 202*h* and the preamble <B> detecting sections 203*a*, 203*b* are "1".

[Specific Example]

It is herein assumed that the data detector 6 receives input data Data having a two-bit error in each of the preambles <A> Da1 to Da8 and preambles <B> Db1, Db2. In this example, the bit-error detecting section 411 has the internal structure of FIG. 5A, the bit-error detecting section 421 has the internal structure of FIG. 5B, each of the preamble <A> detecting sections 202*a* to 202*h* has the internal structure of FIG. 6, and each of the preamble <B> detecting sections 203*a*, 203*b* has the internal structure of FIG. 7.

In this case, the bit errors of the preambles <A> Da1 to Da8 and the preambles <B> Db1, Db2 are not corrected in the preamble <A> error correcting section 401 and the preamble <B> error correcting section 402. The preamble <A> detecting sections 202*a* to 202*h* and the preamble <B> detecting sections 203*a*, 203*b* then receive the preambles <A> Da1 to Da8 and the preambles <B> Db1, Db2. As a result, the pattern represented by the respective output values (the output value pattern) is "1111111111" in the order from the preamble <B> detecting section 203*b* to the preamble <A> detecting section 202*a*. The determining section 204 therefore outputs a data detection signal.

[Effects]

As has been described above, an identification signal can be accurately detected even when bit errors cannot be completely corrected by the preamble <A> error correcting section 401 and the preamble <B> error correcting section 402. The sixth embodiment thus has improved capability of detecting an identification signal over the fourth embodiment.

Seventh Embodiment

[Overall structure]

Figure 13:
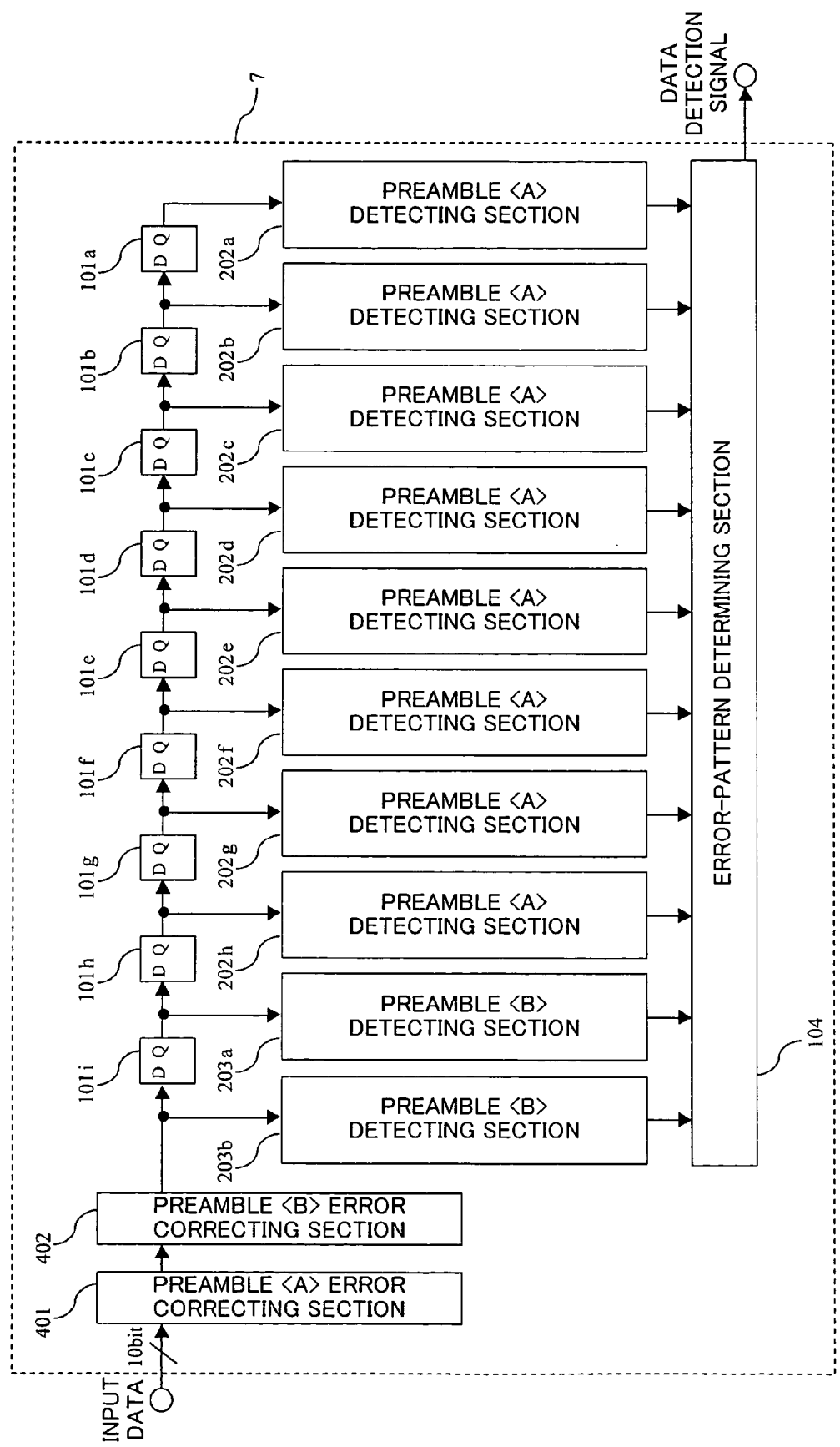
FIG. 13 is a block diagram showing the overall structure of a data detector according to a seventh embodiment of the present invention.

FIG. 13 shows the overall structure of a data detector 7 according to the seventh embodiment of the present invention. The data detector 7 has the same structure as the data detector 3 of FIG. 8 except that the data detector 7 further includes the preamble <A> error correcting section 401 and the preamble <B> error correcting section 402 of FIG. 9.

[Operation]

Hereinafter, operation of the data detector 7 of FIG. 13 will be described.

Like the fourth embodiment, the data detector 7 sequentially receives the first ten bits of input data Data.

Like the fourth embodiment, the preamble <A> error correcting section 401 corrects the bit values of each preamble <A> Da1 to Da8 to the bit values Pa[0:9] of a normal preamble <A>, and the preamble <B> error correcting section 402 corrects the bit values of each preamble <B> Db1, Db2 to the bit values Pb[0:9] of a normal preamble <B>.

Like the third embodiment, each of the flip-flops 101*a* to 101*i* sequentially shifts the input data Data ten-bits by ten-bits to a flip-flop of the subsequent stage in response to every clock. As a result, the preamble <A> detecting sections 202*a* to 202*h* and the preamble <B> detecting sections 203*a*, 203*b* sequentially receive the input data Data ten-bits by ten-bits.

Like the third embodiment, each preamble <A> detecting section 202*a* to 202*h* determines its output value by comparing the received input data with the preamble <A> similar patterns A221 to A265 stored in that preamble <A> detecting section. Each preamble <B> detecting section 203*a*, 203*b* determines its output value by comparing the received input data with the preamble <B> similar patterns B221 to B265 stored in that preamble <B> detecting section.

Like the third embodiment, the error-pattern determining section 104 determines whether or not the pattern represented by the ten output values from the preamble <A> detecting sections 202a to 202h and preamble <B> detecting sections 203a, 203b (the output value pattern) matches any error pattern stored in the error-pattern determining section 104. The error-pattern determining section 104 outputs a data detection signal if the output value pattern matches any error pattern stored in the error-pattern determining section 104. Otherwise, the error-pattern determining section 104 does not output a data detection signal.

[Specific Example]

It is herein assumed that the data detector 7 receives input data Data having a two-bit error in each of the preambles <A> Da1 to Da8 and preamble <B> Db2 and a three-bit or more error in the preamble <B> Db2. In this example, the bit-error detecting section 411 has the internal structure of FIG. 5A, the bit-error detecting section 421 has the internal structure of FIG. 5B, each of the preamble <A> detecting sections 202a to 202h has the internal structure of FIG. 6, and each of the preamble <B> detecting sections 203a, 203b has the internal structure of FIG. 7.

In this case, the bit errors of the preambles <A> Da1 to Da8 and the preambles <B> Db1, Db2 are not corrected in the preamble <A> error correcting section 401 and the preamble <B> error correcting section 402. The preamble <A> detecting sections 202a to 202h and the preamble <B> detecting sections 203a, 203b then receive the preambles <A> Da1 to Da8 and the preambles <B> Db1, Db2. As a result, the pattern represented by the respective output values (the output value pattern) is "1011111111" in the order from the preamble <B> detecting section 203b to the preamble <A> detecting section 202a. Since this output value pattern matches the error pattern P110, the error-pattern determining section 104 outputs a data detection signal.

[Effects]

As has been described above, an identification signal can be accurately detected even when bit errors cannot be completely corrected by the preamble <A> error correcting section 401 and the preamble <B> error correcting section 402. The seventh embodiment thus has improved capability of detecting an identification signal over the fourth embodiment.

Eighth Embodiment

[Overall Structure]

Figure 14:
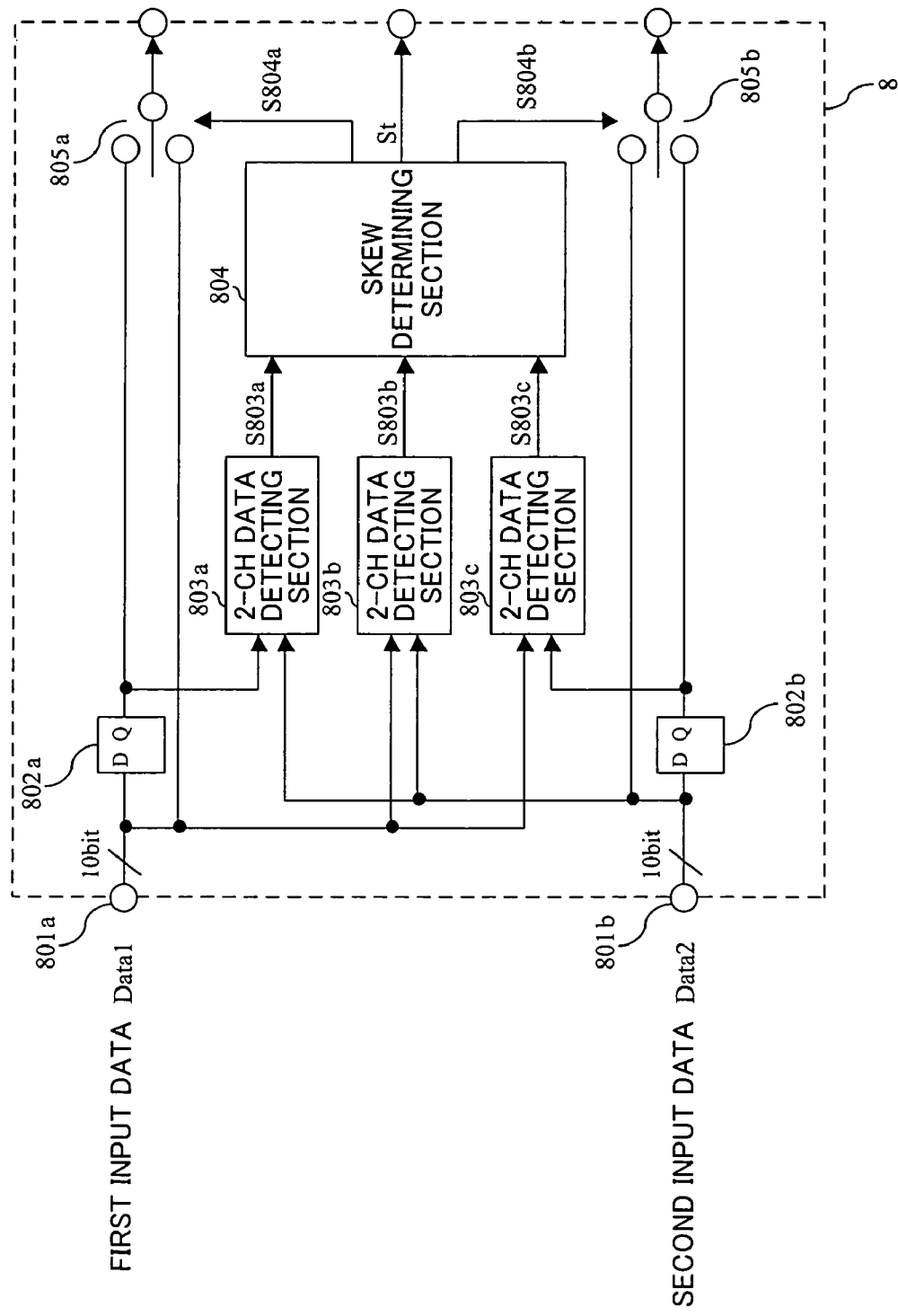
FIG. 14 is a block diagram showing the overall structure of a multi-data channel detector according to an eighth embodiment of the present invention.

FIG. 14 shows the overall structure of a multi-channel data detector 8 according to the eighth embodiment of the present invention. The data detector 8 receives a plurality of input data (first input data Data1 and second input data Data2) transmitted through different transmission paths. The data detector 8 adjusts the difference in delay (skew) between the plurality of input data to zero, and detects an identification signal included in each of the plurality of input data. The data detector 8 includes input terminals 801a, 801b, flip-flops 802a, 802b, 2-channel data detecting sections 803a to 803c, a skew determining section 804, and selecting sections 805a, 805b. The input terminal 801a receives the first input data Data1 from the outside. The input terminal 801b receives the second input data Data2 from the outside. The flip-flop 802a delays the first input data Data1 received by the input terminal 801a by one clock cycle. The flip-flop 802b delays the second input data Data2 received by the input terminal 801b by one clock cycle. The 2-channel data detecting section 803a determines whether or not there is a skew between the first input data Data1 delayed by the flip-flop 802a and the second input data Data2 received by the input terminal 801b. The 2-channel data detecting section 803a outputs a timing match signal S803a if there is no skew therebetween. The 2-channel data detecting section 803b determines whether or not there is a skew between the first input data Data1 received by the input terminal 801a and the second input data Data2 received by the input terminal 801b. The 2-channel data detecting section 803b outputs a timing match signal S803b if there is no skew therebetween. The 2-channel data detecting section 803c determines whether or not there is a skew between the first input data Data1 received by the input terminal 801a and the second input data Data2 delayed by the flip-flop 802b. The 2-channel data detecting section 803c outputs a timing match signal S803c if there is no skew therebetween. Based on the timing match signals S803a to S803c from the 2-channel data detecting sections 803a to 803c, the skew determining section 804 outputs selection signals S804a, S804b to the selecting sections 805a, 805b, respectively, and outputs a data extraction start signal St to an apparatus of the subsequent stage. The selection signals S804a, S804b indicate whether the input data from the input terminal or the input data from the flip-flop is to be selected. Based on the selection signal S804a from the skew determining section 804, the selecting section 805a selects the first input data Data1 received by the input terminal 801a or the first input data Data1 delayed by the flip-flop 802a, and outputs the selected first input data Data1 to the apparatus of the subsequent stage. Based on the selection signal S804b from the skew determining section 804, the selecting section 805b selects the second input data Data2 received by the input terminal 801b or the second input data Data2 delayed by the flip-flop 802b, and outputs the selected second input data Data2 to the apparatus of the subsequent stage.

[Internal Structure of the 2-Channel Data Detecting Sections 803a to 803c]

Figure 15:
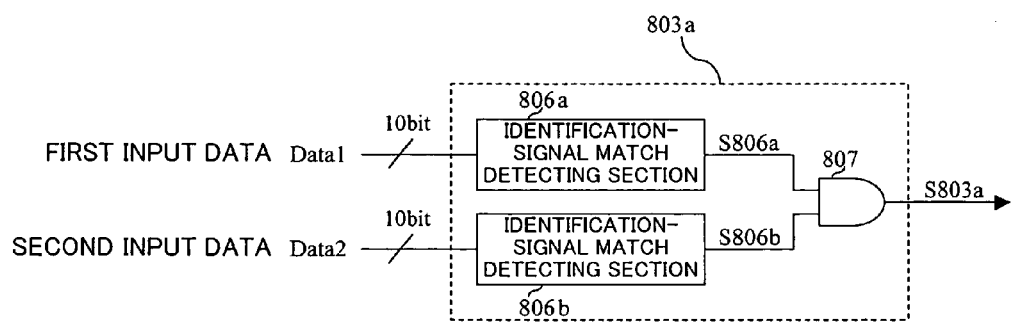
FIG. 15 is a block diagram showing the internal structure of a 2-channel data detecting section in FIG. 14.

Hereinafter, the internal structure of the 2-channel data detecting sections 803a to 803c of FIG. 14 will be described. Since the 2-channel data detecting sections 803a to 803c have the same internal structure, the internal structure of the 2-channel data detecting section 803a is shown in FIG. 15. The 2-channel data detecting section 803a includes identification-signal match detecting sections 806a, 806b and an AND section 807. The identification-signal match detecting section 806a receives first input data Data1. The identification-signal match detecting section 806a outputs a data detection signal S806a to the AND section 807 upon detecting an identification signal (preambles <A> Da1 to Da8 and preambles <B> Db1, Db2) from the received input data Data1. The identification-signal match detecting section 806b receives second input data Data2. The identification-signal match detecting section 806b outputs a data detection signal S806b to the AND section 807 upon detecting an identification signal (preambles <A> Da1 to Da8 and preambles <B> Db1, Db2) from the received input data Data2. The AND section 807 outputs a timing match signal S803a upon receiving both data detection signals S806a and S806b from the identification-signal match detecting sections 806a and 806b.

[Structure of the First and Second Input Data Data1, Data2]

Figure 16:
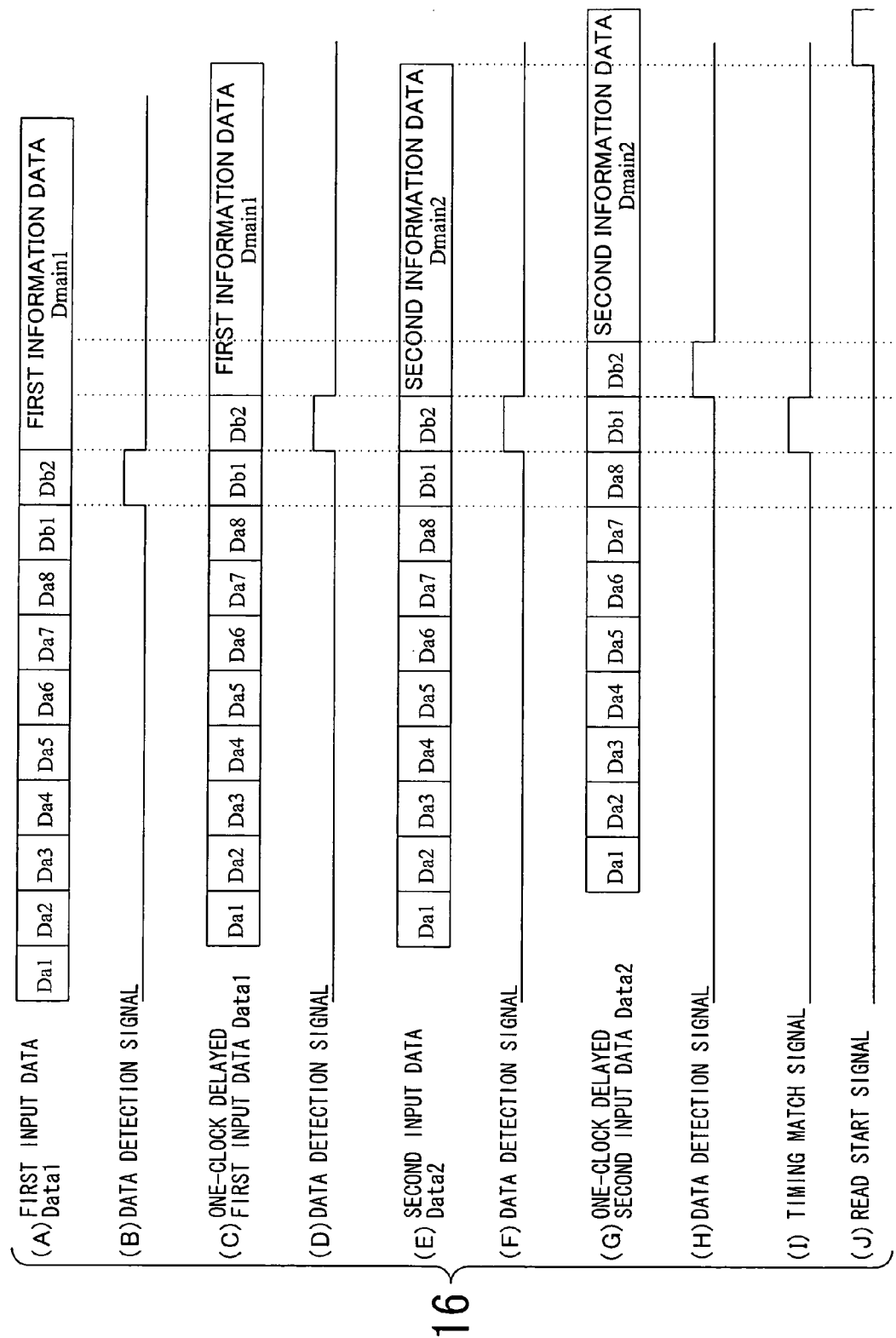
FIGS. 16A to 16J show the structure of first input data and second input data, and waveforms of a data detection signal, a timing match signal and a read start signal.

FIGS. 16A and 16E respectively show the first input data Data1 and the second input data Data2 which are input to the multi-channel data detector 8 of FIG. 14. The first input data Data1 and the second input data Data2 have the same structure as the input data Data of FIG. 2. The first input data Data1 has first information data Dmain1 as information data Dmain. The second input data Data2 has second information data Dmain2 as information data Dmain. Note that the first input data Data1 has the same data length as the second input data Data2.

[Operation]

Hereinafter, operation of the multi-channel data detector 8 of FIG. 14 will be described.

The input terminal 801*a* receives the first input data Data1 from the outside. The input terminal 801*b* receives the second input data Data2 from the outside.

The flip-flop 802*a* delays the first input data Data1 received by the input terminal 801*a* by one clock cycle, and outputs the delayed first input data Data1 to the 2-channel data detecting section 803*a*. The flip-flop 802*b* delays the second input data Data2 received by the input terminal 801*b* by one clock cycle, and outputs the delayed second input data Data2 to the 2-channel data detecting section 803*c*.

In the 2-channel data detecting section 803*a*, the identification-signal match detecting section 806*a* receives the delayed first input data Data1 from the flip-flop 802*a*, and the identification-signal match detecting section 806*b* receives the second input data Data2 from the input terminal 801*b*.

In the 2-channel data detecting section 803*b*, the identification-signal match detecting section 806*a* receives the first input data Data1 from the input terminal 801*a*, and the identification-signal match detecting section 806*b* receives the second input data Data2 from the input terminal 801*b*.

In the 2-channel data detecting section 803*c*, the identification-signal match detecting section 806*a* receives the first input data Data1 from the input terminal 801*a*, and the identification-signal match detecting section 806*b* receives the delayed second input data Data2 from the flip-flop 802*b*.

The identification-signal match detecting section 806*a* in each of the 2-channel data detecting sections 803*a* to 803*c* outputs a data detection signal S806*a* upon detecting an identification signal in the received first input data Data1. For example, the identification-signal match detecting section 806*a* stores a pattern P[10:10] of an identification signal having no bit error (i.e., a pattern of a normal identification signal). The identification-signal match detecting section 806*a* outputs a data detection signal S806*a* when the received first input data (100 bits) matches the stored pattern P[10:10] of a normal identification signal. Like the identification-signal match detecting section 806*a*, the identification-signal match detecting section 806*b* in each of the 2-channel data detecting sections 803*a*, 803*b*, 803*c* outputs a data detection signal S806*b* upon detecting an identification signal in the received second input data Data2.

The AND section 807 in each of the 2-channel data detecting sections 803*a*, 803*b*, 803*c* outputs a timing match signal S803*a*, S803*b*, S803*c* to the skew determining section 804 upon receiving both data detection signals S806*a* and S806*b* from the identification-signal match detecting sections 806*a* and 806*b*.

According to the timing match signals S803*a*, S803*b*, S803*c* from the 2-channel data detecting sections 803*a*, 803*b*, 803*c*, the skew determining section 804 outputs a selection signal S804*a* to the selecting section 805*a*, and outputs a selection signal S804*b* to the selecting section 805*b*. The selection signal S804*a* is a signal indicating which of the first input data Data1 from the input terminal 801*a* and the first input data Data1 from the flip-flop 802*a* is to be selected. The selection signal S804*b* is a signal indicating which of the second input data Data2 from the input terminal 801*b* and the second input data Data2 from the flip-flop 802*b* is to be selected. For example, when the 2-channel data detecting section 803*b* outputs the timing match signal S803*b* to the skew determining section 804, the skew determining section 804 outputs to the selecting section 805*a* a selection signal S804*a* for selecting the first input data Data1 received by the input terminal 801*a*, and outputs to the selecting section 805*b* a selection signal S804*b* for selecting the second input data Data2 received by the input terminal 801*b*.

In addition to the selection signals S804*a*, S804*b* to the selecting sections 805*a*, 805*b*, the skew determining section 804 also outputs a data extraction start signal St to an apparatus of the subsequent stage.

The selecting section 805*a* selects the first input data Data1 from the input terminal 801*a* or the first input data Data1 from the flip-flop 802*a* according to the selection signal S804*a* from the skew determining section 804. The selecting section 805*a* then outputs the selected first input data Data1 to the apparatus of the subsequent stage. The selecting section 805*b* selects the second input data Data2 from the input terminal 801*b* or the second input data Data2 from the flip-flop 802*b* according to the selection signal S804*b* from the skew determining section 804. The selecting section 805*b* then outputs the selected second input data to the apparatus of the subsequent stage.

For example, as shown in FIG. 2, the apparatus of the subsequent stage produces a data period signal which is held at "1" for the same period as the period L of the information data Dmain based on the data extraction start signal St. The apparatus of the subsequent stage can thus accurately extract the period of the information data Dmain1, Dmain2 from the input data Data1, Data2.

[Specific Example]

The above operation will now be described specifically. It is herein assumed that the second input data Data2 is one clock behind the first input data Data1 (FIGS. 16A, 16E). In other words, there is a one-clock skew between the first input data Data1 and the second input data Data2. Note that the first input data Data1 and the second input data Data2 have no bit error.

The flip-flop 802*a* delays the first input data Data1 received by the input terminal 801*a* by one clock cycle (FIG. 16C). The flip-flop 802*b* delays the second input data Data2 received by the input terminal 801*b* by one clock cycle (FIG. 16G).

The identification-signal match detecting sections 806*a*, 806*b* of the 2-channel data detecting section 803*a* output data detection signals S806*a*, S806*b* at the same timing (FIGS. 16D, 16F). The AND section 807 therefore outputs a timing match signal S803*a* to the skew determining section 804 (FIG. 16I).

On the other hand, the identification-signal match detecting sections 806*a*, 806*b* of the 2-channel data detecting section 803*b* do not output data detection signals S806*a*, S806*b* at the same timing (FIGS. 16B, 16F). The AND section 807 therefore does not output a timing match signal S803*b*. The identification-signal match detecting sections 806*a*, 806*b* of the 2-channel data detecting section 803*c* do not output data detection signals S806*a*, S806*b* at the same timing (FIGS. 16B, 16H). The AND section 807 therefore does not output a timing match signal S803*c*.

Since the timing match signal S803*a* is output from the 2-channel data detecting section 803*a*, the skew determining section 804 detects that the second input data is one clock behind the first input data. The skew determining section 804 therefore outputs to the selecting section 805*a* a selection signal S804*a* for selecting the first input data Data1 from the flip-flop 802*a*, and also outputs to the selecting section 805*b* a selection signal S804*b* for selecting the second input data Data2 from the input terminal 801*b*. In addition, the skew determining section 804 outputs a data extraction start signal St to the apparatus of the subsequent stage.

The selecting section 805a selects the first input data Data1 from the flip-flop 802a, i.e., the first input data Data1 delayed by one clock cycle, according to the selection signal S804a from the skew determining section 804, and outputs the selected first input data Data1 to the apparatus of the subsequent stage. The selecting section 805b selects the second input data Data2 from the input terminal 801b according to the selection signal S804b from the skew determining section 804, and outputs the selected second input data Data2 to the apparatus of the subsequent stage.

For example, the apparatus of the subsequent stage then produces a data period signal (FIG. 2) which is held at "1" for the same period as the period L of the information data Dmain based on the data extraction start signal St from the skew determining section 804. As a result, the period of the information data Dmain1, Dmain2 is accurately extracted from the input data Data1, Data2.

[Effects]

As has been described above, a skew between channels can be adjusted to zero and the timing of extracting information data Dmain1, Dmain2 can be accurately detected with a simple structure.

The number of channels is two in the above example. However, a skew between channels can be adjusted to zero and the timing of extracting information data Dmain1, Dmain2 can be accurately detected with a similar structure even when the number of channels is K or more (where K is a natural number).

A skew between channels is one clock in the above example. However, a skew between channels can be adjusted to zero and the timing of extracting information data Dmain1, Dmain2 can be accurately detected with a similar structure even when a skew between channels is two clocks or more. In this case, the multi-channel data detector includes the same number of flip-flops as the number of clocks of a skew to be corrected, and the 2-channel data detecting sections detect an identification signal.

Ninth Embodiment

[Overall Structure]

Figure 17:
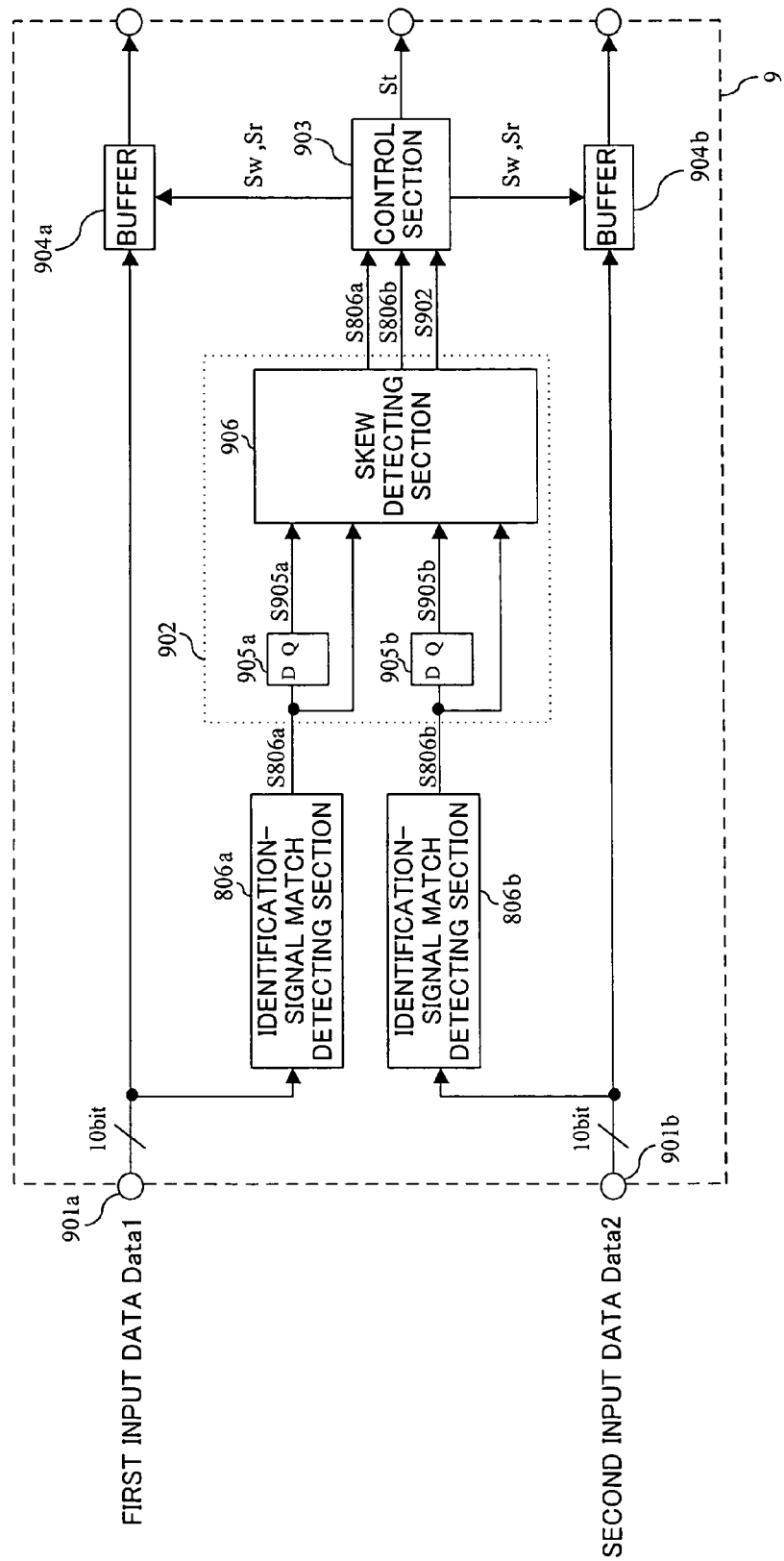
FIG. 17 is a block diagram showing the overall structure of a multi-channel data detector according to a ninth embodiment of the present invention.

FIG. 17 shows the overall structure of a multi-channel data detector 9 according to the ninth embodiment of the present invention. The data detector 9 includes input terminals 901a, 901b, identification-signal match detecting sections 806a, 806b, a skew determining section 902, a control section 903, and buffers 904a, 904b. The input terminal 901a receives first input data Data1 from the outside. The input terminal 901b receives second input data Data2 from the outside. The skew determining section 902 receives data detection signals S806a, S806b from the identification-signal match detecting sections 806a, 806b, respectively, and outputs the data detection signals S806a, S806b to the control section 903. Based on the data detection signals S806a, S806b, the skew determining section 902 detects the timing a skew between the first input data Data1 and the second input data Data2 becomes zero. The skew determining section 902 then outputs to the control section 903 a timing match signal S902 indicating the detected timing. The control section 903 outputs a write start signal Sw to each buffer 904a, 904b according to the data detection signals S806a, S806b from the identification-signal match detecting sections 806a, 806b. The control section 903 also outputs a read start signal Sr to each buffer 904a, 904b as well as outputs a data extraction start signal St to an apparatus of the subsequent stage according to the timing match signal S902 from the skew determining section 902. The buffer 904a stores the first input data Data1 from the input terminal 901a in response to the write start signal Sw from the control section 903. The buffer 904a outputs the stored first input data Data1 in response to the read start signal Sr from the control section 903. The buffer 904b stores the second input data Data2 from the input terminal 901b in response to the write start signal Sw from the control section 903. The buffer 904b outputs the stored second input data Data2 in response to the read start signal Sr from the control section 903.

[Internal Structure of the Skew Determining Section 902]

The skew determining section 902 of FIG. 17 includes flip-flops 905a, 905b and a skew detecting section 906. The flip-flop 905a delays a data detection signal S806a from the identification-signal match detecting section 806a by one clock cycle, and outputs the delayed data detection signal S905a. The flip-flop 905b delays a data detection signal S806b from the identification-signal match detecting section 806b by one clock cycle, and outputs the delayed data detection signal S905b. The skew detecting section 906 outputs a timing match signal S902 based on the data detection signal S806a from the identification-signal match detecting section 806a, the data detection signal S905a from the flip-flop 905a, the data detection signal S806b from the identification-signal match detecting section 806b and the data detection signal S905b from the flip-flop 905b.

[Operation]

Hereinafter, operation of the multi-channel data detector 9 of FIG. 17 will be described.

The input terminal 901a receives the first input data Data1 from the outside. The input terminal 901b receives the second input data Data2 from the outside.

The identification-signal match detecting section 806a processes the first input data Data1 from the input terminal 901a in the same manner as the eighth embodiment, and outputs a data detection signal S806a. The identification-signal match detecting section 806b processes the second input data Data2 from the input terminal 901b in the same manner as the eighth embodiment, and outputs a data detection signal S806b.

Upon receiving the data detection signal S806a from the identification-signal match detecting section 806a through the skew determining section 902, the control section 903 outputs a write start signal Sw to the buffer 904a. In response to the write start signal Sw from the control section 903, the buffer 904a starts storing the first input data Data1 from the input terminal 901a. Upon receiving the data detection signal S806b from the identification-signal match detecting section 806b through the skew determining section 902, the control section 903 outputs a write start signal Sw to the buffer 904b. In response to the write start signal Sw from the control section 903, the buffer 904b starts storing the second input data Data2 from the input terminal 901b.

The flip-flop 905a delays the data detection signal S806a from the identification-signal match detection signal 806a by one clock cycle, and outputs the delayed data detection signal S905a to the skew detecting section 906. The flip-flop 905b delays the data detection signal S806b from the identification-signal match detecting section 806b by one clock cycle, and outputs the delayed data detection signal S905b to the skew detecting section 906.

The skew detecting section 906 detects a combination of data detection signals which are output at the same timing from the data detection signal S806a from the identification-signal match detecting section 806a, the data detection signal S905a from the flip-flop 905a, the data detection signal S806b from the identification-signal match detecting section 806b and the data detection signal S905b from the flip-flop 905b. The skew detecting section 906 then outputs a timing match signal S902 to the control section 903 in synchronization with the rise of the detected data detection signals.

The control section 903 outputs a read start signal Sr to the buffers 904a, 904b as well as outputs a data extraction start signal St to the outside after a time period corresponding to L has passed since the skew detecting section 906 output the timing match signal S902. L is the length of the first information data Dmain1 included in the first input data Data1 (or the second information data Dmain2 included in the second input data Data2).

The buffer 904a starts outputting the stored first input data Data1 to an apparatus of the subsequent stage in response to the read start signal Sr from the control section 903. The buffer 904b starts outputting the stored second input data Data2 to the apparatus of the subsequent stage in response to the read start signal Sr from the control section 903.

For example, the apparatus of the subsequent stage obtains the first information data Dmain1 from the buffer 904a and the second information data Dmain2 from the buffer 904b in response to the data extraction start signal St from the control section 903.

[Specific Example]

The above operation will now be described specifically. It is herein assumed that the second input data Data2 is one clock behind the first input data Data1 (FIGS. 16A, 16E). In other words, there is a one-clock skew between the first input data Data1 and the second input data Data2. Note that the first input data Data1 and the second input data Data2 have no bit error.

When the identification-signal match detecting section 806a outputs a data detection signal S806a and the control section 903 outputs a write start signal Sw to the buffer 904a, the buffer 904a starts storing the first input data Data1 from the input terminal 901a. More specifically, the buffer 904a stores the first information data Dmain1 of the first input data Data1.

When the identification-signal match detecting section 806b outputs a data detection signal S806b and the control section 903 outputs a write start signal Sw to the buffer 904b, the buffer 904b starts storing the second input data Data2 from the input terminal 901b. More specifically, the buffer 904b stores the second information data Dmain2 of the second input data Data2.

The data detection signals S806a, S806b, S905a, S905b from the identification-signal match detecting sections 806a, 806b and the flip-flops 905a, 905b are as shown in FIGS. 16B, 16F, 16D and 16H, respectively. Referring to FIGS. 16A to 16J, the timing the data detection signal S806b is output from the identification-signal match detecting section 806b (FIG. 16F) is the same as the timing the data detection signal S905a is output from the flip-flop 905a (FIG. 16D). No other combinations of data detection signals are output at the same timing. The skew detecting section 906 therefore detects that the second input data Data2 is one clock behind the first input data Data1.

When the skew detecting section 906 outputs a timing match signal S902 in synchronization with the rise of the data detection signal S806b (or the data detection signal S905a) (FIG. 16I), the control section 903 outputs a read start signal Sr (FIG. 16J) to each buffer 904a, 904b as well as outputs a data extraction start signal St to an apparatus of the subsequent stage after a time period corresponding to L has passed since the rise of the timing match signal S902. L is the length of the first information data Dmain1 (or the second information data Dmain2).

The buffer 904a starts outputting the stored first information data Dmain1 to the apparatus of the subsequent stage in response to the read start signal Sr from the control section 903. The buffer 904b starts outputting the stored second information data Dmain2 to the apparatus of the subsequent stage in response to the read start signal Sr from the control section 903.

[Effects]

As has been described above, a skew between channels can be adjusted to zero and the timing of extracting information data Dmain1, Dmain2 can be accurately detected with a simple structure.

The number of channels is two in the above example. However, a skew between channels can be adjusted to zero and the timing of extracting information data Dmain1, Dmain2 can be accurately detected with a similar structure even when the number of channels is K or more (where K is a natural number).

A skew between channels is one clock in the above example. However, a skew between channels can be adjusted to zero and the timing of extracting information data Dmain1, Dmain2 can be accurately detected with a similar structure even when a skew between channels is two clocks or more. In this case, the multi-channel data detector includes the same number of flip-flops as the number of clocks of a skew to be corrected, and the skew detecting section detects a skew between channels.

Tenth Embodiment

[Overall Structure]

Figure 18:
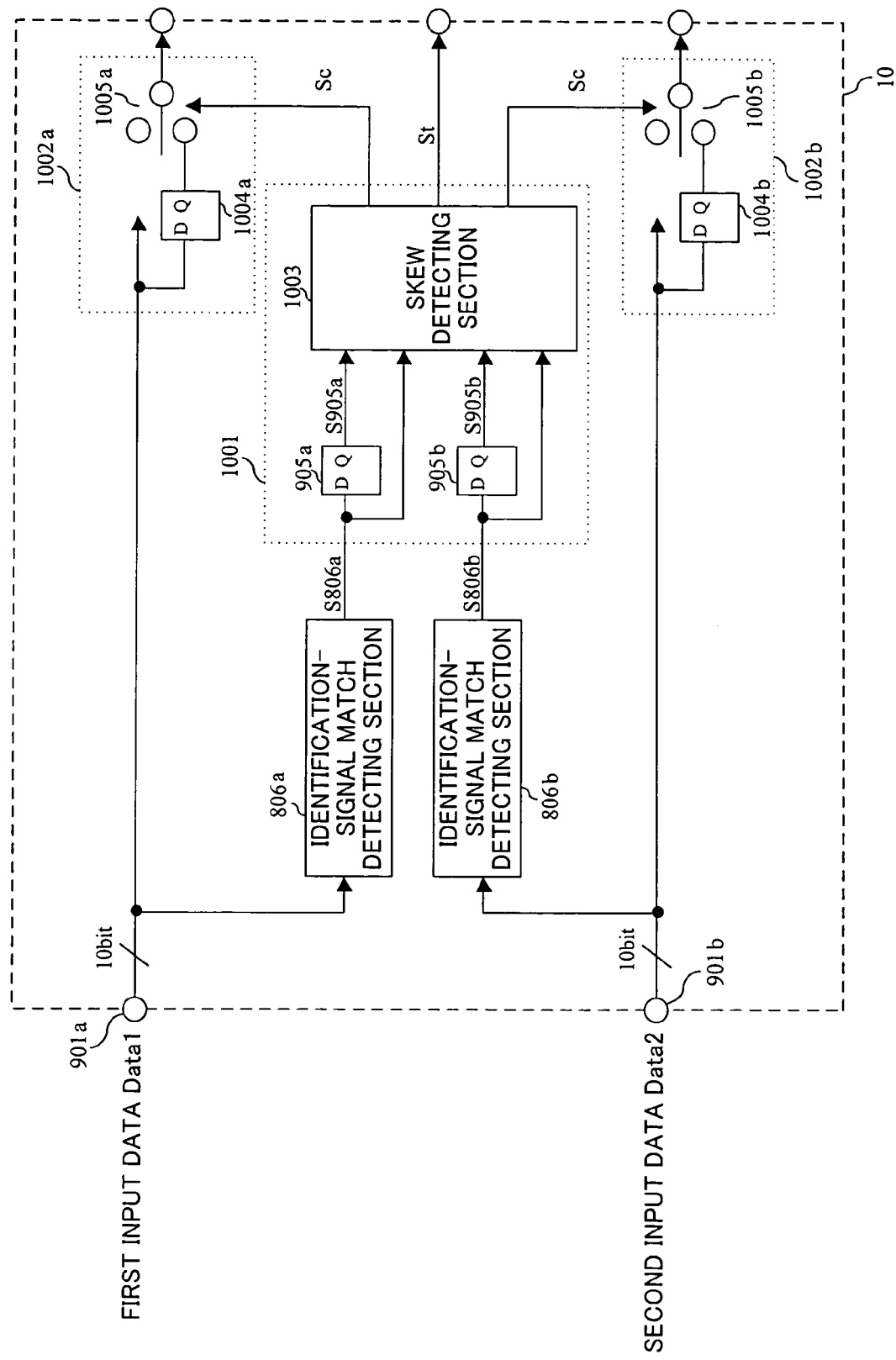
FIG. 18 is a block diagram showing the overall structure of a multi-channel data detector according to a tenth embodiment of the present invention.

FIG. 18 shows the overall structure of a multi-channel data detector 10 according to the tenth embodiment of the present invention. The multi-channel data detector 10 has the same structure as the multi-channel data detector of FIG. 17 except that the skew determining section 902, the control section 903 and the buffers 904a, 904b of FIG. 17 are replaced with a skew determining section 1001 and delay correcting sections 1002a, 1002b. Based on data detection signals S806a, S806b from the identification-signal match detecting sections 806a, 806b, the skew determining section 1001 outputs a data extraction start signal St to an apparatus of the subsequent stage and outputs a skew correction signal Sc to each delay correcting section 1002a, 1002b. The skew correction signal Sc is a signal for adjusting the skew to zero. The delay correcting sections 1001a, 1001b correct the skew between the first input data Data1 and the second input data Data2 according to the skew correction signal Sc from the skew determining section 1001.

[Internal Structure of the Skew Determining Section 1001]

The skew determining section 1001 of FIG. 18 has the same structure as the skew determining section 902 of FIG. 17 except that the skew detecting section 906 of FIG. 17 is replaced with a skew detecting section 1003. The skew detecting section 1003 outputs a data extraction start signal St to the apparatus of the subsequent stage as well as outputs a skew correction signal Sc to each delay correcting section 1002a, 1002b, based on a data detection signal S806a from the identification-signal match detecting section 806a, a data detection signal S905a from the flip-flop 905a, a data detection signal S806b from the identification-signal match detecting section 806b, and a data detection signal S905b from the flip-flop 905b.

[Internal Structure of the Delay Correcting Sections 1002a, 1002b]

The delay correcting section 1002a of FIG. 18 includes a flip-flop 1004a and a selecting section 1005a. The flip-flop 1004a delays the first input data Data1 received by the input terminal 901a by one clock cycle. The selecting section 1005a selects the first input data Data1 from the input terminal 901a or the delayed first input data Data1 from the flip-flop 1004a according to the skew correction signal Sc from the skew detecting section 1003. The selecting section 1005a then outputs the selected first input data Data1 to the apparatus of the subsequent stage.

The delay correcting section 1002b of FIG. 18 includes a flip-flop 1004b and a selecting section 1005b. The flip-flop 1004b delays the second input data Data2 received by the input terminal 901b by one clock cycle. The selecting section 1005b selects the second input data Data2 from the input terminal 901b or the delayed second input data Data2 from the flip-flop 1004b according to the skew correction signal Sc from the skew detecting section 1003. The selecting section 1005b then outputs the selected second input data Data2 to the apparatus of the subsequent stage.

[Operation]

Operation of the multi-channel data detector 10 of FIG. 18 is different from that of the multi-channel data detector of FIG. 17 in the processing after detection of a skew.

Like the skew detecting section 906, the skew detecting section 1003 detects a combination of data detection signals which are output at the same timing from the data detection signal S806a from the identification-signal match detecting section 806a, the data detection signal S905a from the flip-flop 905a, the data detection signal S806b from the identification-signal match detecting section 806b and the data detection signal S905b from the flip-flop 905b.

The flip-flop 1004a delays the first input data Data1 received by the input terminal 901a by one clock cycle. The flip-flop 1004b delays the second input data Data2 received by the input terminal 901b by one clock cycle.

The skew detecting section 1003 outputs a data extraction start signal St to the apparatus of the subsequent stage as well as outputs a skew correction signal Sc to the delay correcting sections 1002a, 1002b in synchronization with the rise of the detected data detection signals. The skew correction signal Sc indicates which of the input data from the input terminal and the input data from the flip-flop is to be selected.

The selecting section 1005a selects the first input data Data1 from the input terminal 901a or the delayed first input data Data1 from the flip-flop 1004a according to the skew correction signal Sc from the skew detecting section 1003. The selecting section 1005a then outputs the selected first input data Data1 to the apparatus of the subsequent stage. The selecting section 1005b selects the second input data Data2 from the input terminal 901b or the delayed second input data Data2 from the flip-flop 1004b according to the skew correction signal Sc from the skew detecting section 1003. The selecting section 1005b then outputs the selected second input data Data2 to the apparatus of the subsequent stage.

[Specific Example]

The above operation will now be described specifically. It is herein assumed that the second input data Data2 is one clock behind the first input data Data1 (FIGS. 16A, 16E). In other words, there is a one-clock skew between the first input data Data1 and the second input data Data2. Note that the first input data Data1 and the second input data Data2 have no bit error.

Like the ninth embodiment, the skew detecting section 1003 detects that the second input data Data2 is one clock behind the first input data Data1, and outputs a data extraction start signal St to the apparatus of the subsequent stage in synchronization with the rise of the data detection signal S806b (or the data detection signal S905a). At the same time, the skew detecting section 1003 outputs to the selecting section 1005a a skew correction signal Sc for selecting the delayed first input data Data1 from the flip-flop 1004a, and outputs to the selecting section 1005b a skew correction signal Sc for selecting the second input data Data2 from the input terminal 901b.

The selecting section 1005a outputs the selected first input data, i.e., the delayed first input data from the flip-flop 1004a, to the apparatus of the subsequent stage according to the skew correction signal Sc from the skew detecting section 1003. The selecting section 1005b outputs the selected second input data, i.e., the second input data from the input terminal 901b, to the apparatus of the subsequent stage according to the skew correction signal Sc from the skew detecting section 1003.

[Effects]

As has been described above, a skew between channels can be adjusted to zero and the timing of extracting information data Dmain1, Dmain2 can be accurately detected with a simple structure.

The number of channels is two in the above example. However, a skew between channels can be adjusted to zero and the timing of extracting information data Dmain1, Dmain2 can be accurately detected with a similar structure even when the number of channels is K or more (where K is a natural number).

A skew between channels is one clock in the above example. However, a skew between channels can be adjusted to zero and the timing of extracting information data Dmain1, Dmain2 can be accurately detected with a similar structure even when a skew between channels is two clocks or more. In this case, the multi-channel data detector includes the same number of flip-flops as the number of clocks of a skew to be corrected, and the skew detecting section detects a skew between channels.

Eleventh Embodiment

[Relation Between a Skew and a Bit Error]

If there is a defective transmission path, a skew is likely to be generated between a plurality of input data transmitted through different transmission paths. Moreover, input data transmitted through a defective transmission path is likely to have bit errors. Accordingly, if there is a skew between a plurality of input data, the input data is likely to have bit errors.

[Overall Structure]

Figure 19:
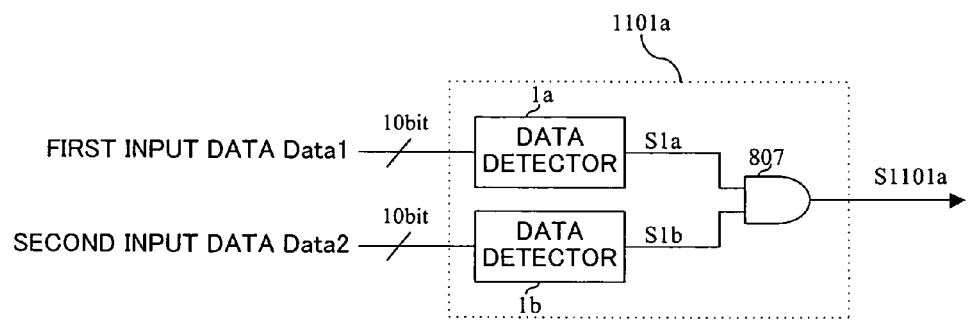
FIG. 19 is a block diagram showing the internal structure of a 2-channel data detecting section included in a multi-channel data detector according to an eleventh embodiment of the present invention.

A multi-channel data detector according to the eleventh embodiment of the present invention has the same structure as the multi-channel detector of FIG. 14 except that the 2-channel data detecting sections 803a, 803b, 803c of FIG. 14 are replaced with 2-channel data detecting sections 1101a, 1101b, 1101c of FIG. 19 (Since the 2-channel data detecting sections 1101a, 1101b, 1101c have the same internal structure, only the internal structure of the 2-channel data detecting section 1101a is shown in FIG. 19.). The 2-channel data detecting section 1101a determines whether or not there is a skew between the first input data Data1 delayed by the flip-flop 802a and the second input data Data2 received by the input terminal 801b. The 2-channel data detecting section 1101a outputs a timing match signal S1101a if there is no skew therebetween. The 2-channel data detecting section 1101b determines whether or not there is a skew between the first input data Data1 received by the input terminal 801a and the second input data Data2 received by the input terminal 801b. The 2-channel data detecting section 1101b outputs a timing match signal S1101b if there is no skew therebetween. The 2-channel data detecting section 1101c determines whether or not there is a skew between the first input data Data1 received by the input terminal 801a and the second input data Data2 delayed by the flip-flop 802b. The 2-channel data detecting section 1101c outputs a timing match signal S1101c if there is no skew therebetween. The skew determining section 804 outputs selection signals S804a, S804b to the selecting sections 805a, 805b, respectively, as well as outputs a data extraction start signal St to an apparatus of the subsequent stage, according to the timing match signals S1101a to S1101c from the 2-channel data detecting sections 1101a to 1101c. The selection signals S804a, S804b are signals indicating which of the input data from the input terminal and the input data from the flip-flop is to be selected.

[Internal Structure of the 2-Channel Data Detecting Sections]

The 2-channel data detecting sections 1101a, 1101b, 1101c will now be described. Since the 2-channel data detecting sections 1101a, 1101b, 1101c have the same internal structure, only the 2-channel data detecting section 1101a will be described. The 2-channel data detecting section 1101a has the same structure as the 2-channel data detecting section 803a of FIG. 15 except that the identification-signal match detecting sections 806a, 806b are replaced with data detectors 1a, 1b. Each data detector 1a, 1b has the same structure as the data detector 1 of FIG. 1. Each data detector 1a, 1b receives input data Data1 or Data2 and outputs a data detection signal S1a or Sab.

[Operation]

The multi-channel data detector of the eleventh embodiment is different from the eighth embodiment in operation of the 2-channel data detecting sections 1101a, 1101b, 1102c.

The data detector 1a in each 2-channel data detecting section 1101a, 1101b, 1101c detects an identification signal (preambles <A> Da1 to Da8 and preambles <B> Db1, Db2) and outputs a data detection signal S1a by processing the first input data Data1 in the same manner as the first embodiment.

The data detector 1b in each 2-channel data detecting section 1101a, 1101b, 1101c detects an identification signal (preambles <A> Da1 to Da8 and preambles <B> Db1, Db2) and outputs a data detection signal S1b by processing the second input data Data2 in the same manner as the first embodiment.

[Comparison to the Eighth Embodiment]

Hereinafter, operation of the eighth embodiment and the eleventh embodiment will be described. It is herein assumed that the first input data Data1 and the second input data Data2 have bit errors.

In the multi-channel data detector 8 of the eighth embodiment, the bit pattern of the received identification signal does not match the identification-signal pattern P[10:10] stored in the identification-signal match detecting sections 806a, 806b. The identification-signal match detecting sections 806a, 806b therefore do not output data detection signals S806a, S806b.

In the multi-channel data detector of the eleventh embodiment, however, the data detectors 1a, 1b can detect the identification signal by respectively processing the first and second input data Data1, Data2 in the same manner as the first embodiment. The data detectors 1a, 1b therefore output data detection signals S1a, S1b, respectively.

[Effects]

As has been described above, the data detection signals S1a, S1b are output even when the input data have bit errors. By using the signals S1a, S1b, a skew can be adjusted to zero and the timing of extracting information data Dmain1, Dmain2 can be accurately detected. The eleventh embodiment thus has improved capability of detecting information data over the eighth embodiment.

In the eleventh embodiment, the data detector 1 of FIG. 1 is used as the data detectors 1a, 1b. However, the present invention is not limited to this. The data detectors 2, 3, 4, 5, 6, 7 of FIGS. 4, 8, 9, 11, 12, 13 may alternatively be used as the data detectors 1a, 1b.

Twelfth Embodiment

[Overall Structure]

Figure 20:
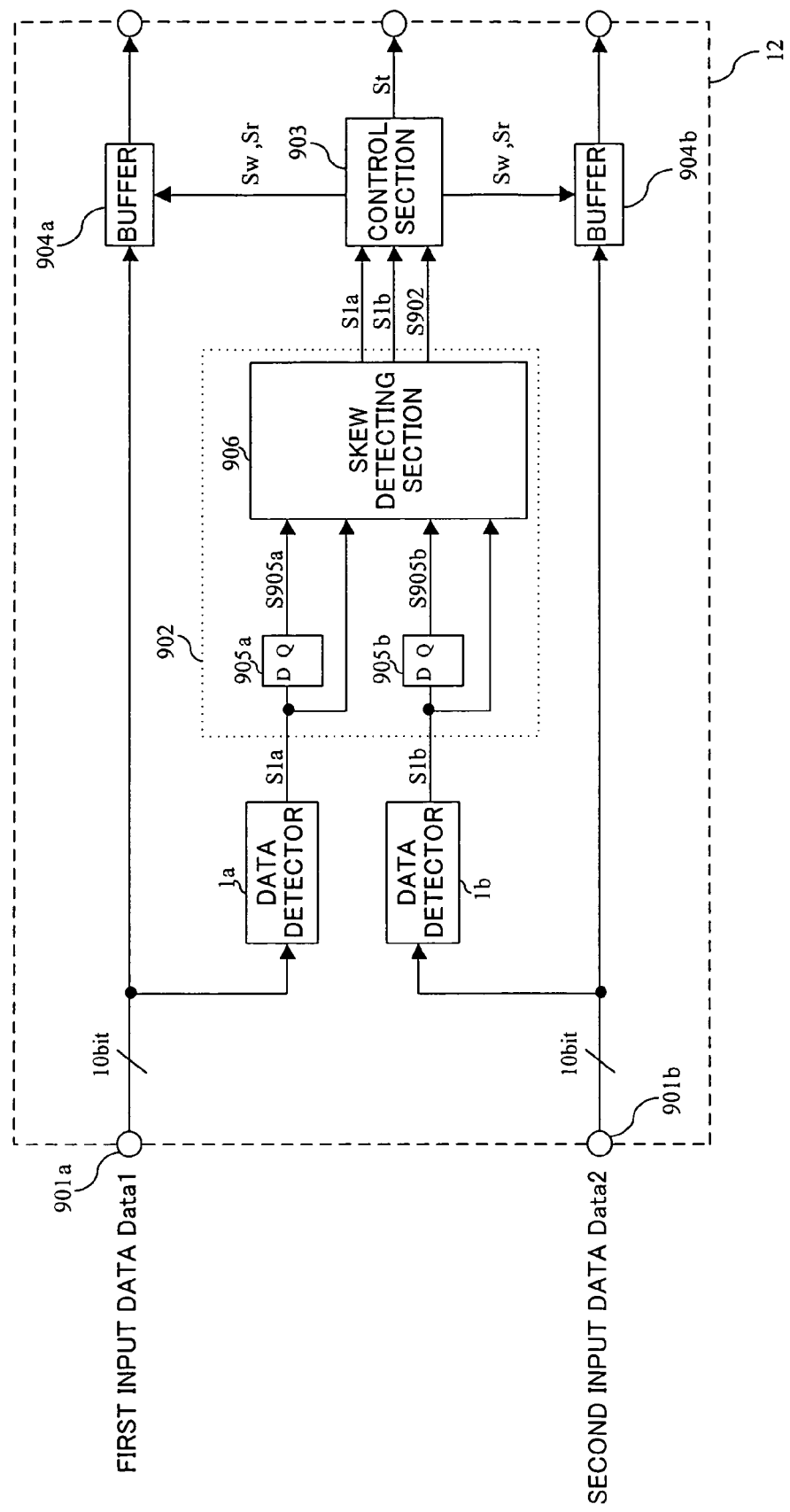
FIG. 20 is a block diagram showing the overall structure of a multi-channel data detector according to a twelfth embodiment of the present invention.

FIG. 20 shows the overall structure of a multi-channel data detector 12 according to the twelfth embodiment of the present invention. The multi-channel data detector 12 has the same structure as the multi-channel data detector of FIG. 17 except that the identification-signal match detecting sections 806a, 806b of FIG. 17 are replaced with data detectors 1a, 1b. Each data detector 1a, 1b has the same structure as the data detector 1 of FIG. 1. The data detectors 1a, 1b receive input data and output data detection signals S1a, S1b, respectively. The skew determining section 902 receives the data detection signals S1a, S1b from the data detectors 1a, 1b, respectively, and outputs the received data detection signals S1a, S1b to the control section 903. Based on the data detection signals S1a, S1b, the skew determining section 902 detects the timing a skew between the first input data Data1 and the second input data Data2 becomes zero. The skew determining section 902 then outputs to the control section 903 a timing match signal S902 indicating the detected timing. The control section 903 outputs a write start signal Sw to each buffer 904a, 904b based on the data detection signals S1a, S1b from the data detectors 1a, 1b. Based on the timing match signal S902 from the skew determining section 902, the control section 903 outputs a read start signal Sr to each buffer 904a, 904b and outputs a data extraction start signal St to an apparatus of the subsequent stage.

[Comparison to the Ninth Embodiment]

Hereinafter, operation of the ninth embodiment and the twelfth embodiment will be described. It is herein assumed that the first input data Data1 and the second input data Data2 have bit errors.

In the multi-channel data detector 9 of the ninth embodiment, the bit pattern of the received identification signal does not match the identification-signal pattern P[10:10] stored in the identification-signal match detecting sections 806a, 806b. The identification-signal match detecting sections 806a, 806b therefore do not output data detection signals S806a, S806b.

In the multi-channel data detector 12 of the twelfth embodiment, however, the data detectors 1a, 1b can detect the identification signal by respectively processing the first and second input data Data1, Data2 in the same manner as the first embodiment. The data detectors 1a, 1b therefore output data detection signals S1a, S1b, respectively.

[Effects]

As has been described above, the data detection signals S1a, S1b are output even when the input data have bit errors. By using the signals S1a, S1b, a skew can be adjusted to zero and the timing of extracting information data Dmain1, Dmain2 can be accurately detected. The twelfth embodiment thus has improved capability of detecting information data over the ninth embodiment.

In the twelfth embodiment, the data detector 1 of FIG. 1 is used as the data detectors 1a, 1b. However, the present invention is not limited to this. The data detectors 2, 3, 4, 5, 6, 7 of FIGS. 4, 8, 9, 11, 12, 13 may alternatively be used as the data detectors 1*a*, 1*b*.

Thirteenth Embodiment

[Overall Structure]

Figure 21:
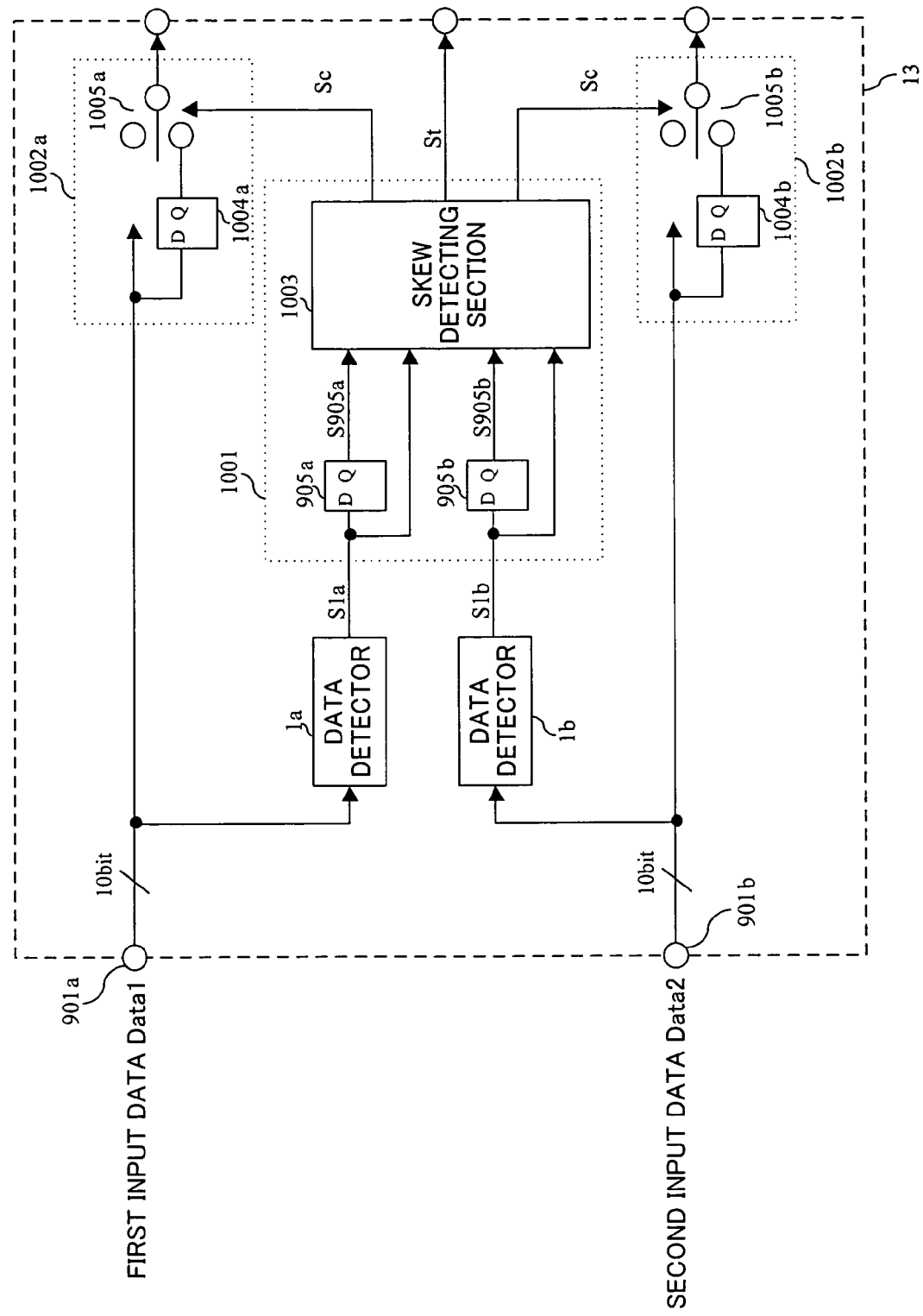
FIG. 21 is a block diagram showing the overall structure of a multi-channel data detector according to a thirteenth embodiment of the present invention.

FIG. 21 shows the overall structure of a multi-channel data detector 13 according to the thirteenth embodiment of the present invention. The multi-channel data detector 13 has the same structure as the multi-channel data detector of FIG. 18 except that the identification-signal match detecting sections 806*a*, 806*b* of FIG. 18 are replaced with data detectors 1*a*, 1*b*. Each data detector 1*a*, 1*b* has the same structure as the data detector 1 of FIG. 1. The data detectors 1*a*, 1*b* receive input data and output data detection signals S1*a*, S1*b*, respectively. Based on the data detection signals S1*a*, S1*b* from the data detectors 1*a*, 1*b*, the skew determining section 1001 outputs a data extraction start signal St to an apparatus of the subsequent stage and outputs a skew correction signal Sc to each delay correcting section 1002*a*, 1002*b*. The skew correction signal Sc is a signal for adjusting the skew to zero.

[Comparison to the Tenth Embodiment]

Hereinafter, operation of the tenth embodiment and the thirteenth embodiment will be described. It is herein assumed that the first input data Data1 and the second input data Data2 have bit errors.

In the multi-channel data detector 10 of the tenth embodiment, the bit pattern of the received identification signal does not match the identification-signal pattern P[10:10] stored in the identification-signal match detecting sections 806*a*, 806*b*. The identification-signal match detecting sections 806*a*, 806*b* therefore do not output data detection signals S806*a*, S806*b*.

In the multi-channel data detector 13 of the thirteenth embodiment, however, the data detectors 1*a*, 1*b* can detect the identification signal by respectively processing the first and second input data Data1, Data2 in the same manner as the first embodiment. The data detectors 1*a*, 1*b* therefore output data detection signals S1*a*, S1*b*, respectively.

[Effects]

As has been described above, the data detection signals S1*a*, S1*b* are output even when the input data have bit errors. By using the signals S1*a*, S1*b*, a skew can be adjusted to zero and the timing of extracting information data Dmain1, Dmain2 can be accurately detected. The thirteenth embodiment thus has improved capability of detecting information data over the tenth embodiment.

In the thirteenth embodiment, the data detector 1 of FIG. 1 is used as the data detectors 1*a*, 1*b*. However, the present invention is not limited to this. The data detectors 2, 3, 4, 5, 6, 7 of FIGS. 4, 8, 9, 11, 12, 13 may alternatively be used as the data detectors 1*a*, 1*b*.

For example, the present invention is useful for interfaces of DVD (Digital Versatile Disc) players, liquid crystal televisions and digital televisions.

What is claimed is:

1. A data detector for detecting an identification signal of a prescribed format from N-bit wide parallel input data (where N is a natural number), comprising: P first comparing sections (where P is a natural number); Q second comparing sections (where Q is a natural number); and a determining section, wherein each of the P first comparing sections compares one of first P data of continuous (P+Q) data in the parallel input data with a first pattern, each of the Q second comparing sections compares one of Q data following the P data with a second pattern, and the determining section determines whether the identification signal has been detected or not according to a comparison result of the P first comparing sections and a comparison result of the Q second comparing sections.

2. The data detector according to claim 1, further comprising (P+Q) data holding sections which are connected in series, wherein the first data holding section of the (P+Q) data holding sections receives the parallel input data in synchronization with a prescribed timing, each of the remaining data holding sections holds data held in the previous data holding section in synchronization with the prescribed timing, each of the P first comparing sections compares data held in a corresponding one of the first P data holding sections of the (P+Q) data holding sections with the first pattern, and each of the Q second comparing sections compares data held in a corresponding one of the remaining Q data holding sections of the (P+Q) data holding sections with the second pattern.

3. The data detector according to claim 1, wherein each of the P first comparing sections determines whether or not one of the P data matches the first pattern, each of the Q second comparing sections determines whether or not one of the Q data matches the second pattern, and the determining section determines that the identification signal has been detected when a total number of the first comparing sections which have determined that one of the P data does not match the first pattern and the second comparing sections which have determined that one of the Q data does not match the second pattern is less than a prescribed value.

4. The data detector according to claim 1, wherein each of the P first comparing sections compares one of the P data with the first pattern to determine whether or not a number of matching bits is equal to or larger than a prescribed value, each of the Q second comparing sections compares one of the Q data with the second pattern to determine whether or not a number of matching bits is equal to or larger than a prescribed value, and the determining section determines that the identification signal has been detected when all of the P first comparing sections have determined that the number of matching bits is equal to or larger than the prescribed value as well as all of the Q second comparing sections have determined that the number of matching bits is equal to or larger than the prescribed value.

5. The data detector according to claim 1, wherein each of the P first comparing sections compares one of the P data with the first pattern to determine whether or not a number of matching bits is equal to or larger than a prescribed value, each of the Q second comparing sections compares one of the Q data with the second pattern to determine whether or not a number of matching bits is equal to or larger than a prescribed value, and the determining section determines that the identification signal has been detected when a total number of the first comparing sections which have determined that the number of matching bits is less than the prescribed value and the second comparing sections which have determined that the number of matching bits is less than the prescribed value is less than a prescribed value.

6. The data detector according to claim 1, wherein the determining section determines whether the identification signal has been detected or not based on comparison between a comparison result pattern (a pattern of a length (P+Q) obtained from a comparison result of the P first comparing sections and a comparison result of the Q second comparing sections) and a third pattern.

7. The data detector according to claim 6, further comprising an error-rate detecting section for detecting an error rate of the parallel input data, wherein the determining section changes the third pattern to be compared with the comparison result pattern, according to the error rate detected by the error-rate detecting section.

8. The data detector according to claim 1, further comprising an error-rate detecting section for detecting an error rate of the parallel input data, wherein the first comparing sections change the first pattern according to the error rate detected by the error-rate detecting section, and the second comparing sections change the second pattern according to the error rate detected by the error-rate detecting section.

9. The data detector according to claim 1, further comprising:
   a first error correcting section for comparing the received parallel input data with a third pattern, and outputting the third pattern as the parallel input data when a number of matching bits is equal to or larger than a prescribed value and outputting the parallel input data when the number of matching bits is less than the prescribed value; and
   a second error correcting section for comparing the received parallel input data with a fourth pattern, and outputting the fourth pattern as the parallel input data when a number of matching bits is equal to or larger than a prescribed value and outputting the parallel input data when the number of matching bits is less than the prescribed value, wherein
   each of the P first comparing sections compares one of the first P data of the continuous (P+Q) data in the parallel input data received through the first error correcting section with the first pattern, and
   each of the Q second comparing sections compares one of the Q data following the P data in the parallel input data received through the second error correcting section with the second pattern.

10. The data detector according to claim 9, further comprising an error-rate detecting section for detecting an error rate of the parallel input data, wherein the first error-rate detecting section and the second error-rate detecting section change the respective prescribed value according to the error rate detected by the error-rate detecting section.

* * * * *